(12) United States Patent
Altheimer

(10) Patent No.: US 11,684,220 B2
(45) Date of Patent: Jun. 27, 2023

(54) FOLDING CUTTING BOARD

(71) Applicant: ANCHOR HOCKING, LLC, Columbus, OH (US)

(72) Inventor: Dana W. Altheimer, Columbus, OH (US)

(73) Assignee: ANCHOR HOCKING LLC, Columbus, OH (US)

( * ) Notice: Subject to any disclaimer, the term of this patent is extended or adjusted under 35 U.S.C. 154(b) by 0 days.

(21) Appl. No.: 17/393,765

(22) Filed: Aug. 4, 2021

(65) Prior Publication Data

US 2021/0361121 A1  Nov. 25, 2021

Related U.S. Application Data

(63) Continuation of application No. 16/811,185, filed on Mar. 6, 2020, now Pat. No. 11,109,717.

(60) Provisional application No. 62/814,319, filed on Mar. 6, 2019.

(51) Int. Cl.
*A47J 47/00* (2006.01)

(52) U.S. Cl.
CPC .................................. *A47J 47/005* (2013.01)

(58) Field of Classification Search
CPC ..................................................... A47J 47/005
See application file for complete search history.

(56) References Cited

U.S. PATENT DOCUMENTS

| | | | | |
|---|---|---|---|---|
| 1,693,761 A | * | 12/1928 | Macripo | A47J 47/005 269/54.5 |
| D159,881 S | | 8/1950 | Zekowski | |
| D161,596 S | | 1/1951 | Russ | |
| 2,609,024 A | | 9/1952 | Russ | |
| 4,243,184 A | * | 1/1981 | Wright | A47J 43/25 269/289 R |
| D372,176 S | | 7/1996 | Meisner | |
| D381,564 S | | 7/1997 | Kolada | |
| 6,789,792 B1 | * | 9/2004 | Angland | A47J 47/005 269/302.1 |
| 6,971,644 B1 | * | 12/2005 | Kennedy | A47J 47/005 269/302.1 |
| 7,252,255 B2 | * | 8/2007 | Cornfield | G01G 19/56 269/291 |

(Continued)

OTHER PUBLICATIONS

Kordes Rustic Small Wood Cutting Board. Date first available on Amazon.com Dec. 16, 2020; https://www.amazon.com/rustic-small-cutting-board-1/dp/B08QRGN4QP/ref (Year: 2020).

*Primary Examiner* — Nirvana Deonauth
(74) *Attorney, Agent, or Firm* — Tucker Ellis LLP

(57) ABSTRACT

Provided is a cutting board including a first board section, a second board section, and a hinge assembly pivotally coupling the first and second board sections together. The first board section has a first top surface, a first bottom surface, a first inner surface, a first outer surface, a first front surface, and a first rear surface and the second board section has a second top surface, a second bottom surface, a second inner surface, a second outer surface, a second front surface, and a second rear surface. The hinge assembly pivotally and removably couples the first and second board sections together such that the first and second inner surfaces face one another in an unfolded position and the first and second bottom surfaces face one another in a folded position.

17 Claims, 27 Drawing Sheets

(56) References Cited

U.S. PATENT DOCUMENTS

| | | |
|---|---|---|
| D605,908 S | 12/2009 | Pearl |
| D721,915 S | 2/2015 | Khuu |
| D803,640 S * | 11/2017 | Grimm .......................... D7/698 |
| D887,228 S | 6/2020 | Kwiatkowski |
| D920,749 S | 6/2021 | Altheimer |
| D926,538 S | 8/2021 | Kim |
| D928,429 S | 8/2021 | Ou Yang |
| D930,446 S | 9/2021 | Altheimer |
| 2007/0007705 A1* | 1/2007 | Chen ..................... A47J 47/005 |
| | | 269/289 R |
| 2009/0283952 A1* | 11/2009 | Sellers .................. A47J 47/005 |
| | | 269/289 R |
| 2014/0251866 A1* | 9/2014 | Smallman ................ B65D 1/34 |
| | | 206/557 |
| 2018/0242739 A1* | 8/2018 | Adams .................. A47B 96/205 |
| 2020/0187720 A1* | 6/2020 | Kilcher ................... A47J 47/16 |

* cited by examiner

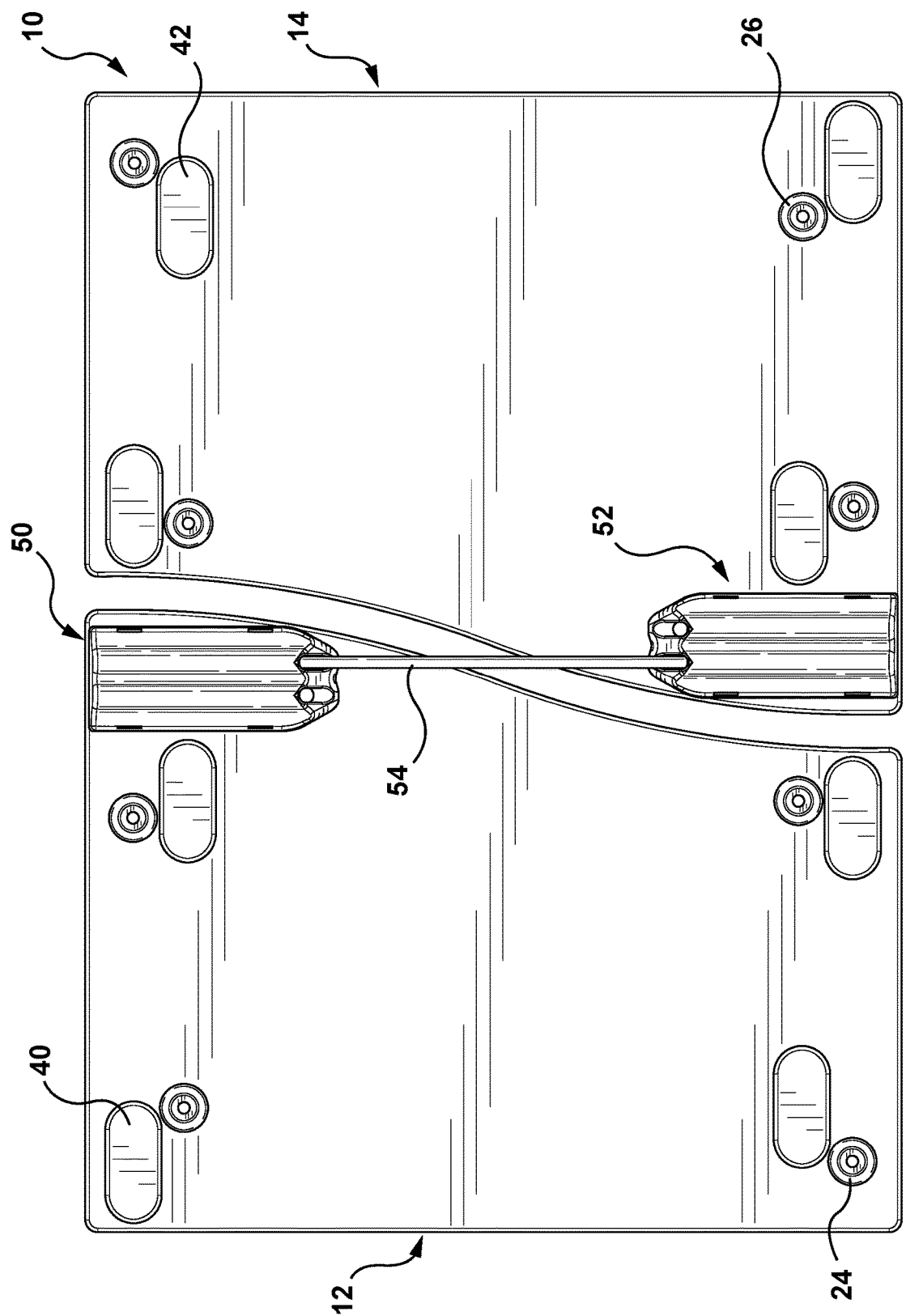

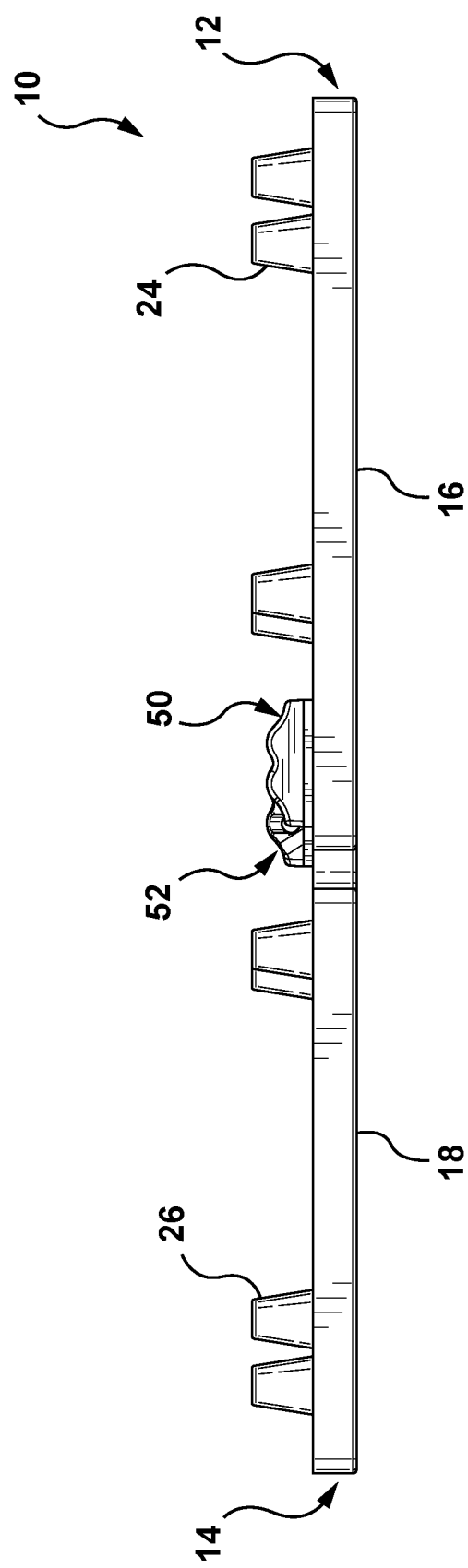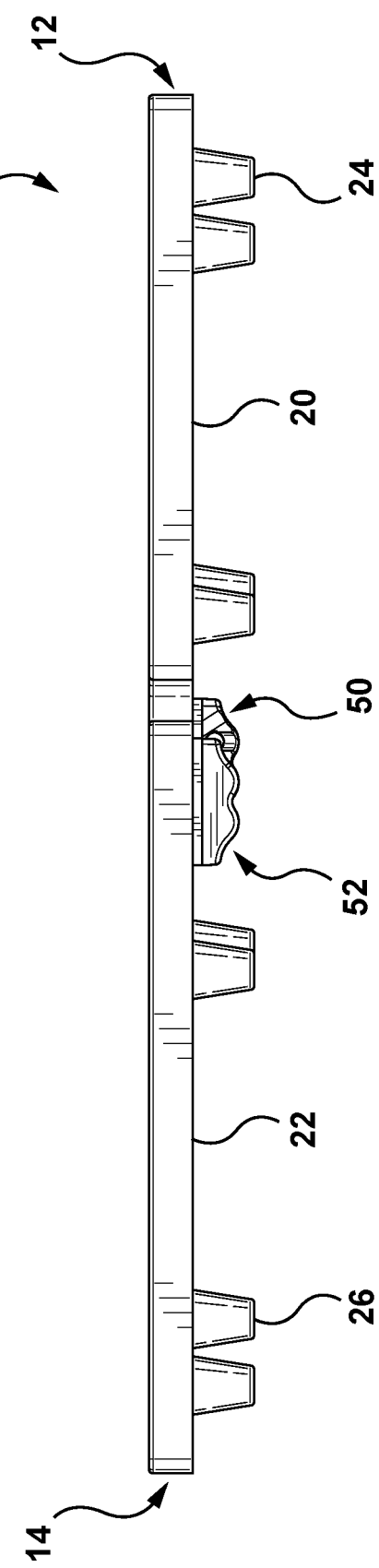

FOLDING CUTTING BOARD

RELATED APPLICATION

This application is a continuation of U.S. patent application Ser. No. 16/811,185 filed on Mar. 6, 2020, which claims priority to and the benefit of U.S. Provisional Application Ser. No. 62/814,319 filed on Mar. 6, 2019, the entirety of which are incorporated herein by reference.

TECHNICAL FIELD

In general, the present invention relates to a cutting board, and in particular to a folding cutting board.

BACKGROUND OF THE INVENTION

A cutting board can be provided that has rigid surface to cut food on while protecting a countertop surface from being marred by a knife. The cutting board may be made of any suitable material, such as wood, plastic, granite, etc.

SUMMARY OF THE INVENTION

In accordance with an embodiment of the present invention, a cutting board is provided that includes a first board section having a first top surface, a first bottom surface, a first inner surface, a first outer surface, a first front surface, and a first rear surface, a second board section having a second top surface, a second bottom surface, a second inner surface, a second outer surface, a second front surface, and a second rear surface, and a hinge assembly configured to pivotally and removably couple the first and second board sections together such that the first and second inner surfaces face one another in an unfolded position and the first and second bottom surfaces face one another in a folded position.

In accordance with another embodiment of the present invention, a cutting board is provided that includes a first board section having a first top surface, a first bottom surface, a first inner surface, a first outer surface, a first front surface, and a first rear surface, a second board section having a second top surface, a second bottom surface, a second inner surface, a second outer surface, a second front surface, and a second rear surface, and a hinge assembly pivotally coupling the first and second board sections together such that the first and second inner surfaces face one another in an unfolded position and the first and second bottom surfaces face one another in a folded position, the hinge assembly including a first hinge element attached to the first bottom surface, a second hinge element attached to the second bottom surface, and a hinge rod removably coupled to the first and second hinge elements, wherein the hinge assembly has a first configuration where the first and second inner surfaces are spaced from one another and a second configuration where the first and inner surfaces abut one another.

In accordance with still another embodiment of the present invention, a cutting board is provided that includes a board section having a top surface, a bottom surface, an inner surface, an outer surface, a front surface, and a rear surface, and a hinge element attached to the bottom surface, the hinge element including a hinge block and a hinge cover removably connected to the hinge block, the hinge block having a pair of rod receptacles, each rod receptacle having an opening and a passage in communication with one of the openings for receiving an end of a hinge rod.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 6 is a bottom view of the cutting board.
FIG. 7 is a front view of the cutting board.
FIG. 8 is a rear view of the cutting board.

DETAILED DESCRIPTION OF THE INVENTION

Figure 1:
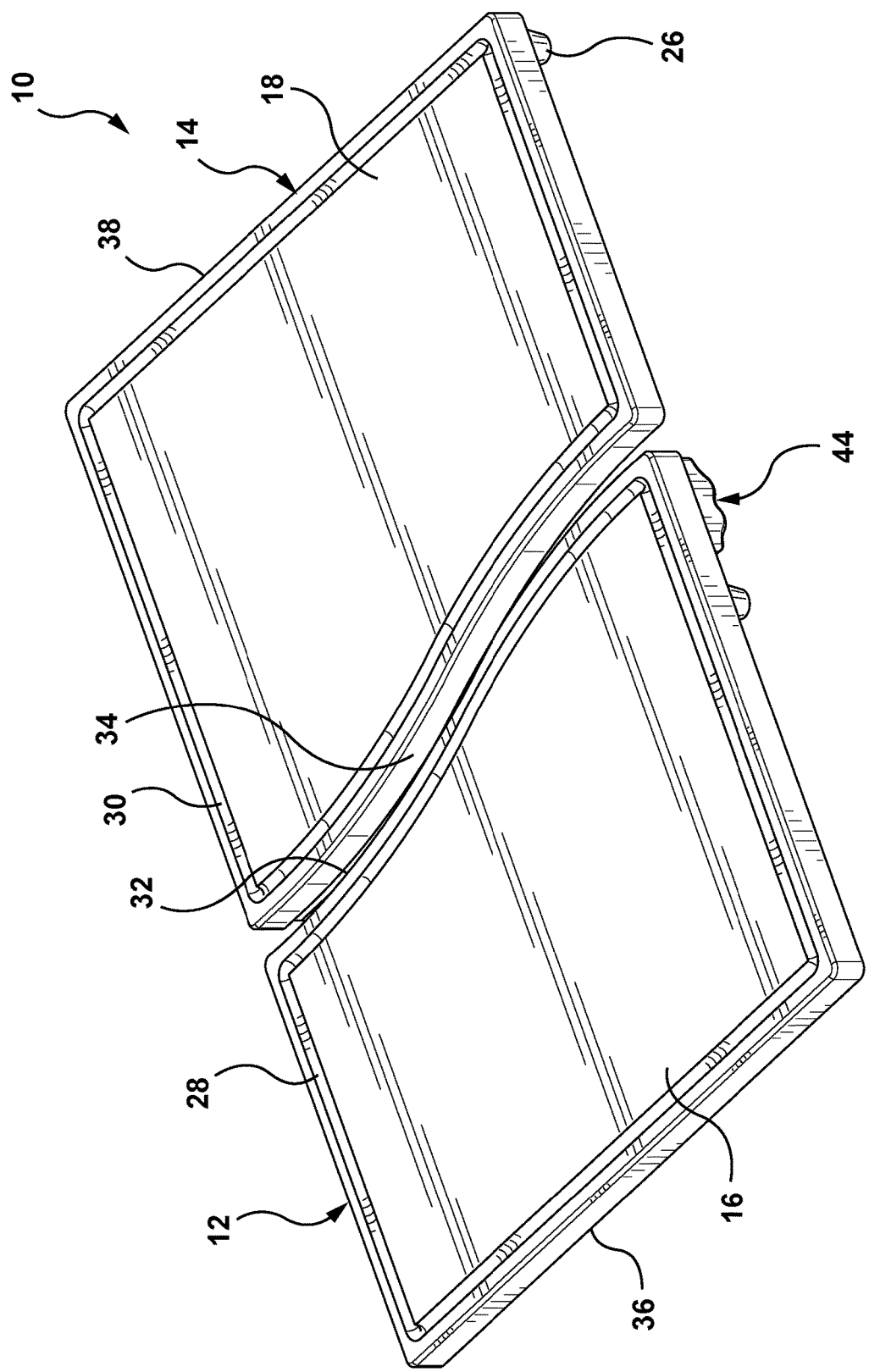
FIG. 1 is a top perspective view of an exemplary cutting board in an unfolded position and a first configuration.

Embodiments of the invention relate to methods and systems that relate to a cutting board including a first board section, a second board section, and a hinge assembly pivotally coupling the first and second board sections together. The first board section has a first top surface, a first bottom surface, a first inner surface, a first outer surface, a first front surface, and a first rear surface and the second board section has a second top surface, a second bottom surface, a second inner surface, a second outer surface, a second front surface, and a second rear surface. The hinge assembly pivotally couples the first and second board sections together such that the first and second inner surfaces face one another in an unfolded position and the first and second bottom surfaces face one another in a folded position.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Figure 2:
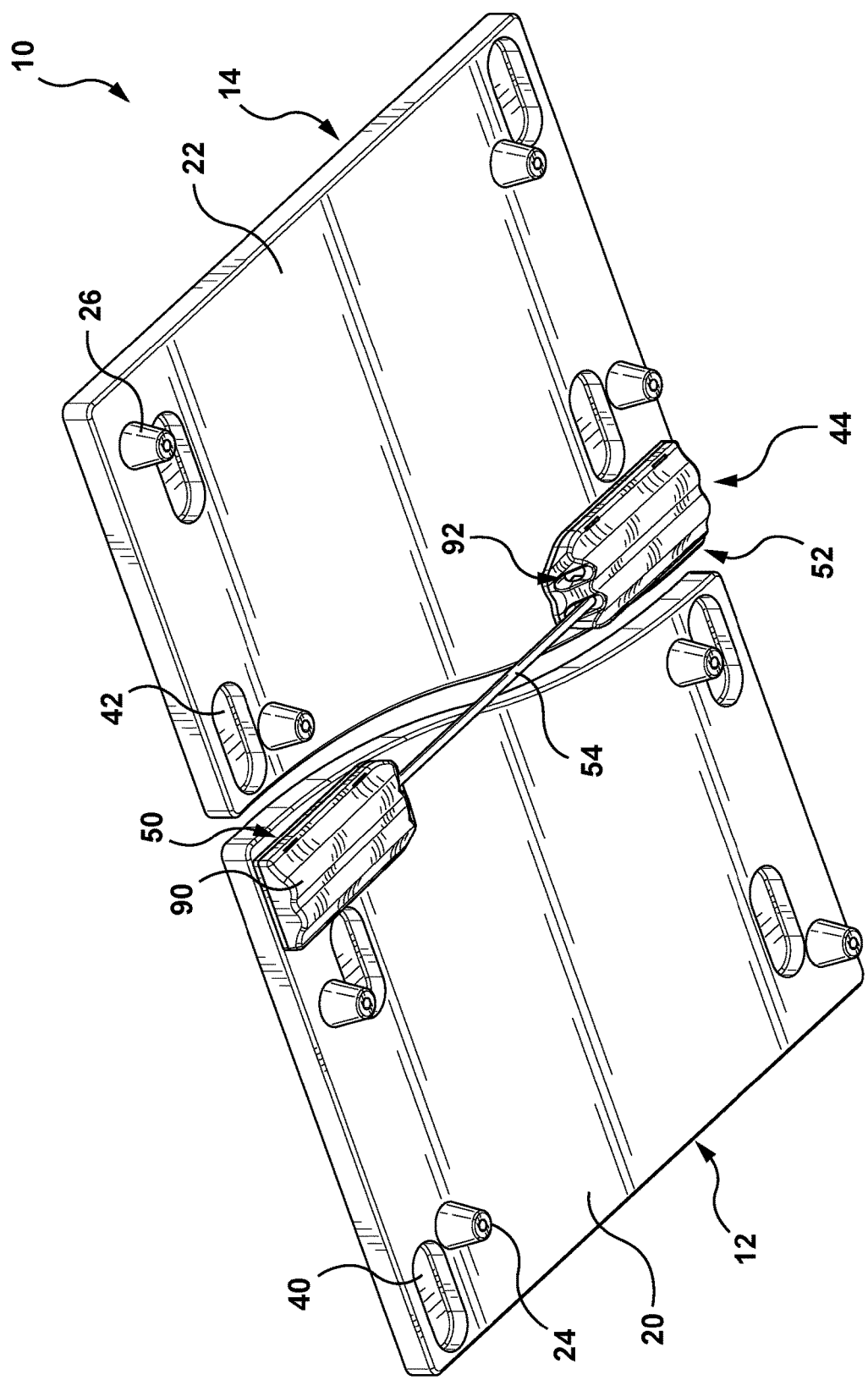
FIG. 2 is a bottom perspective view of the cutting board.
Figures 3, 4:
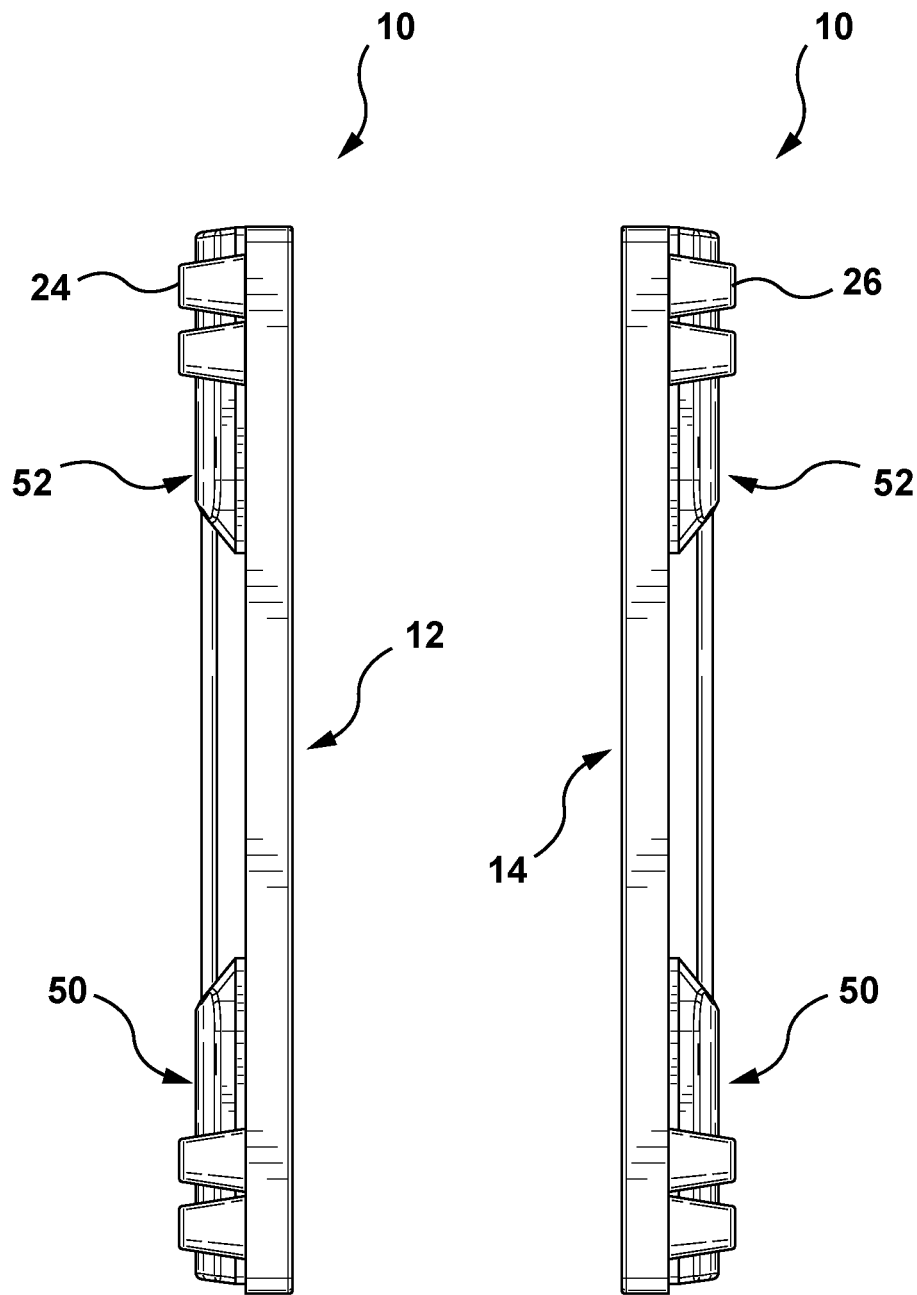
FIG. 3 is a left side view of the cutting board.
FIG. 4 is a right side view of the cutting board.
Figure 5:
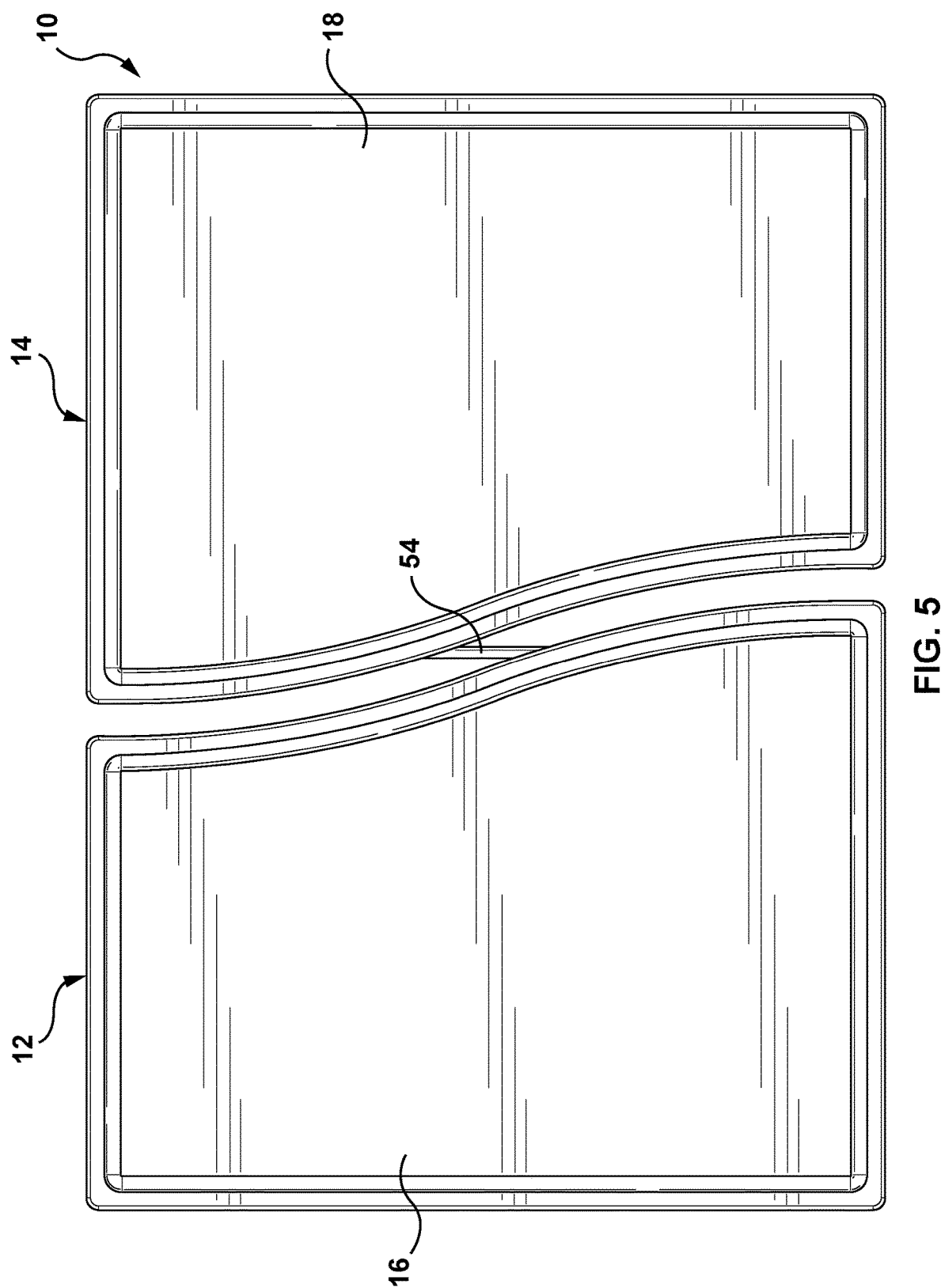
FIG. 5 is a top view of the cutting board.
Figure 9:
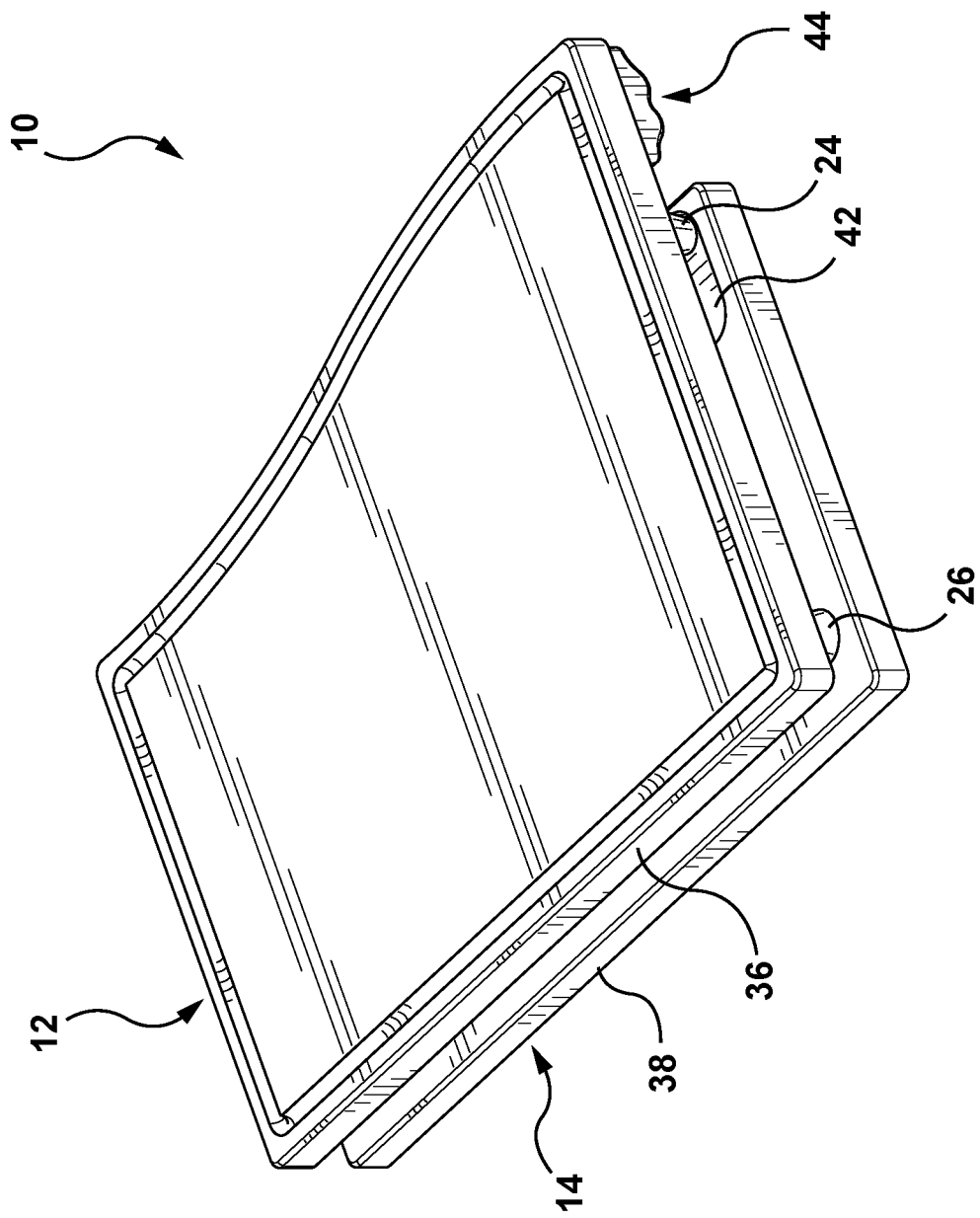
FIG. 9 is a perspective view of the cutting board in a folding position.
Figure 10:
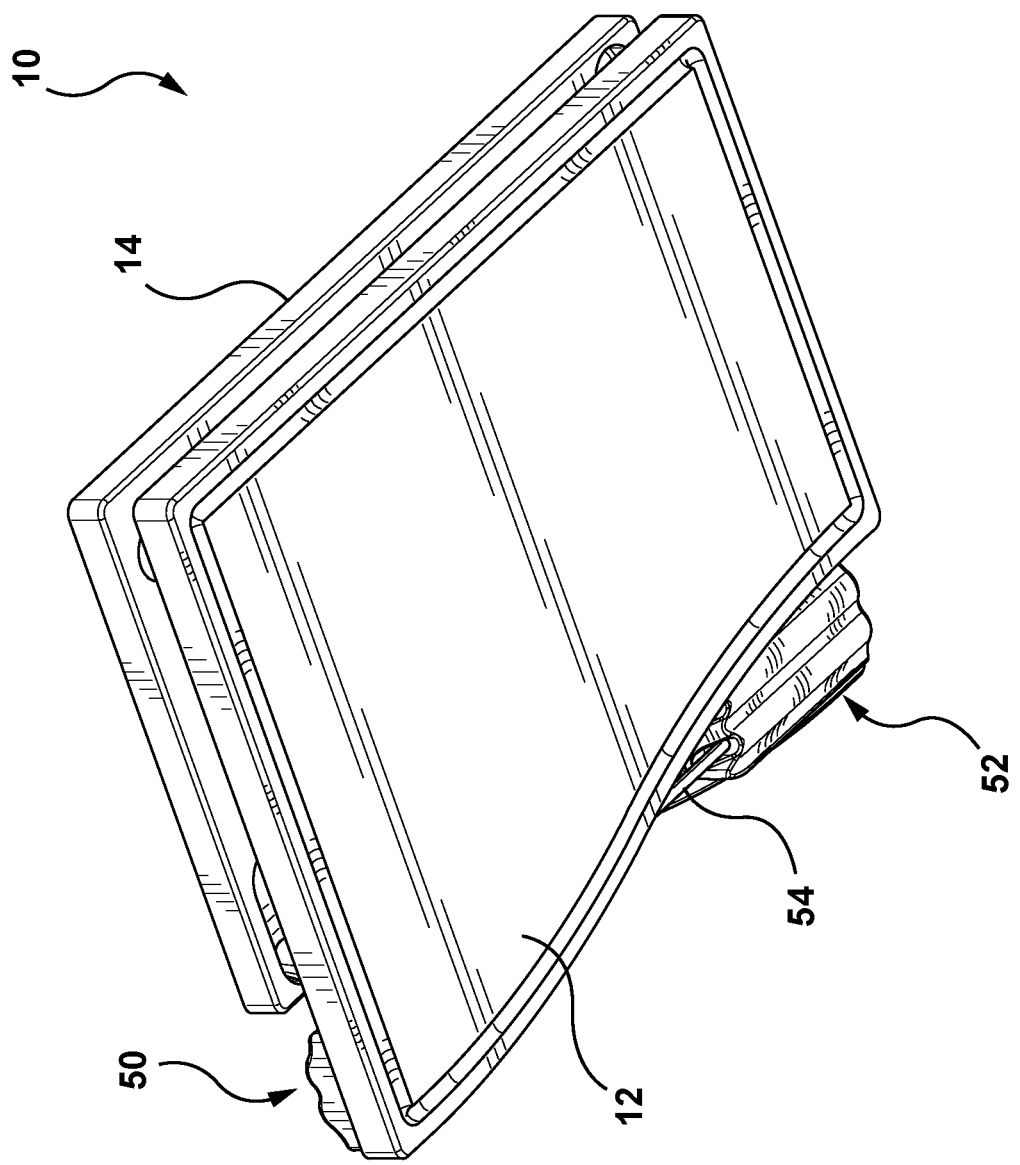
FIG. 10 is another perspective view of the cutting board in the folded position.

Turning now to FIGS. 1 and 2, an exemplary cutting board is shown at reference numeral 10. The cutting board 10 includes a first board section 12 and a second board section 14 that may be made of any suitable material, such as wood, bamboo, etc. The first and second board sections 12 and 14 are spaced from one another to prevent bacteria migration between the two sections such that one type of food, such as meat, could be cut on the first board section 12 and another type of food, such as produce, could be cut on the second board section 14. Each of the board sections 12 and 14 includes a respective top surface 16, 18 serving as a cutting surface and a respective bottom surface 20, 22.

The bottom surfaces 20 and 22 are configured to be spaced from a countertop surface by a plurality of feet 24 and 26 that prevent the cutting board from sliding on the countertop surface. The plurality of feet 24 and 26 may be respectively attached to the first and second board sections 12 and 14 in any suitable manner, such as by a fastener, adhesive, etc., and the feet 24 and 26 may be made of a suitable material, such as rubber. The feet 24 and 26 space the cutting board 10 from the countertop surface to allow for the attachment of accessories as discussed below, to allow a user to grip a side of the cutting board 10 with their non-cutting hand during cutting, and to allow for the countertop surface to be wiped down around and under the cutting board 10 during use. The top surfaces 16 and 16 include a respective well 28, 30 extending along the perimeter of top surfaces 16 and 18 and radially inwardly spaced from an edge of each board section 12, 14 for collection liquids, such as juice, blood, etc.

Each of the first and second cutting board sections 12 and 14 also include a respective inner surface 32, 34 that face one another when connected, and a respective outer surface 36, 38 opposite the respective inner surface 32, 34. The inner surfaces 32 and 34 are correspondingly curved such that when the inner surfaces 32 and 34 are adjacent one another or abutting one another, the outer profile of the first and second cutting board sections 12 and 14 is rectangular. The inner surfaces 32 and 34 are curved such that in a first configuration shown in FIG. 1, the inner surfaces 32 and 34 are spaced from one another, for example uniformly spaced, along their lengths and in a second configuration shown in FIG. 21, the inner surfaces 32 and 34 abut one another along their lengths to form a one-piece board without a space between the sections 12 and 14. For example, the inner surfaces 32 and 34 are inverted one hundred eighty degrees from one another, such as in a substantially s-curved shape, where the inner surface 32, 34 of one of the board sections 12 and 14 starts inward and curves outward while the inner surface 32, 34 of the other section 12, 14 starts outward and curves inward.

Figure 11:
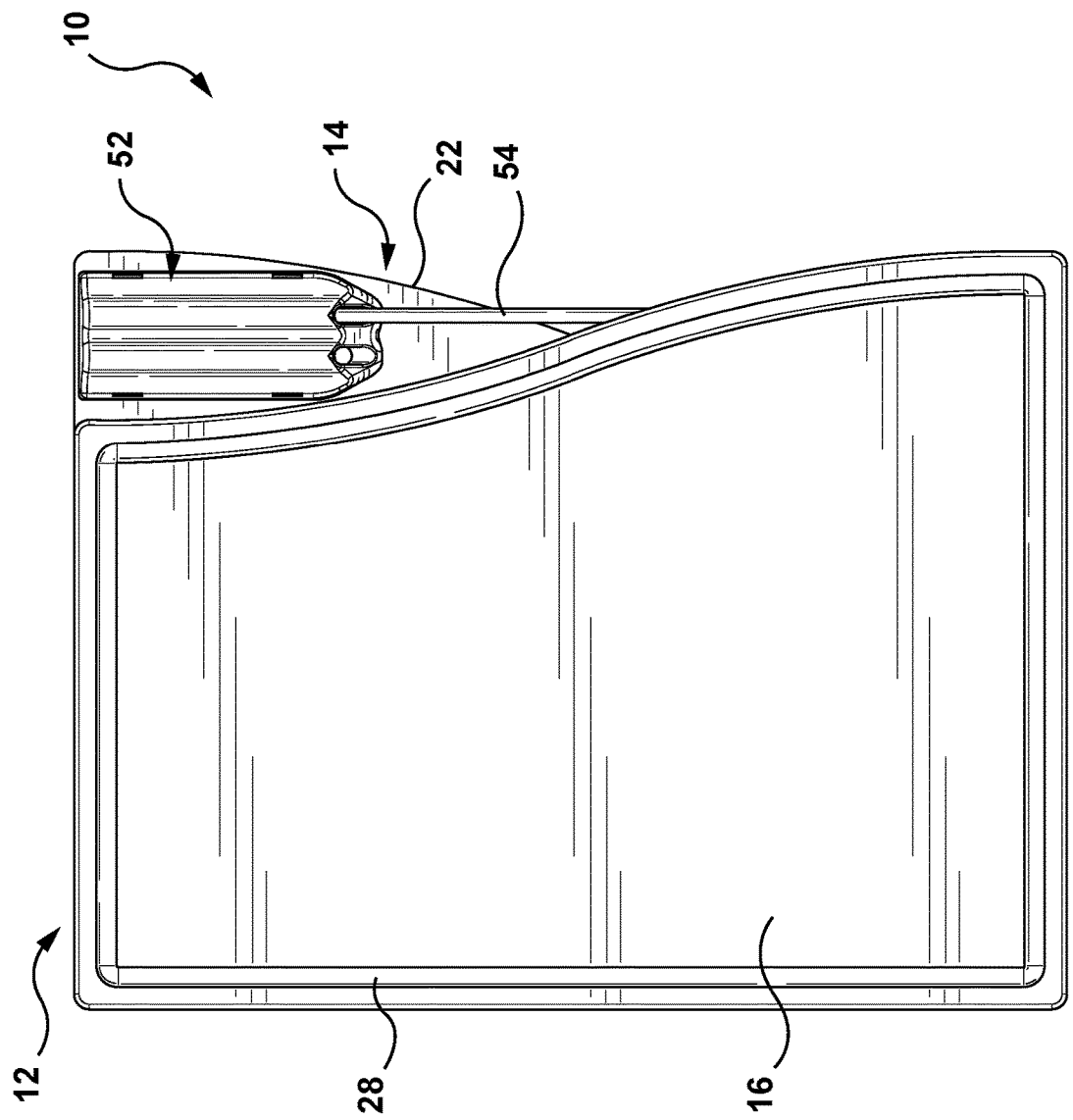
FIG. 11 is a top view of the cutting board in the folded position.
Figure 12:
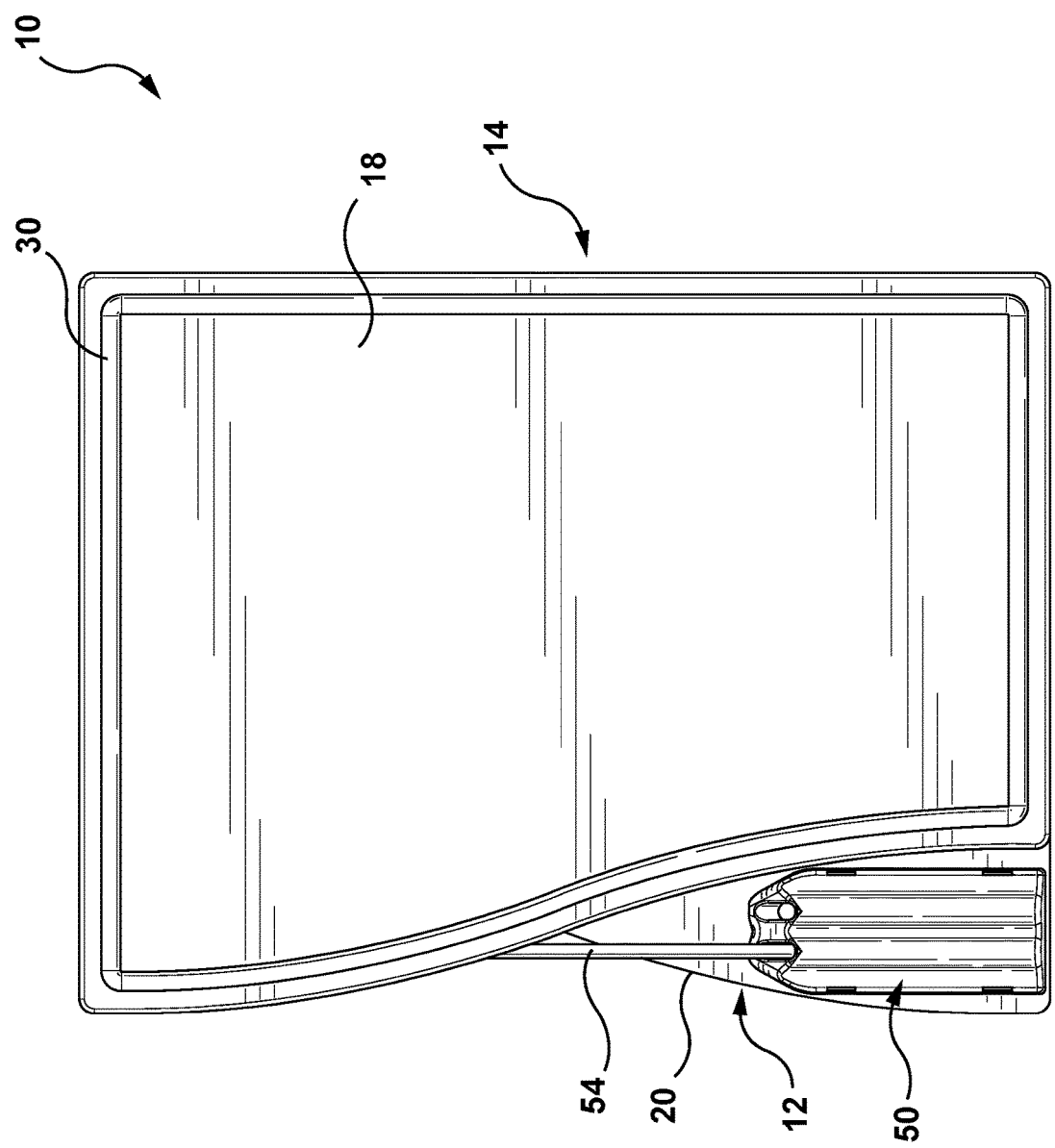
FIG. 12 is a bottom view of the cutting board in the folded position.
Figure 13:
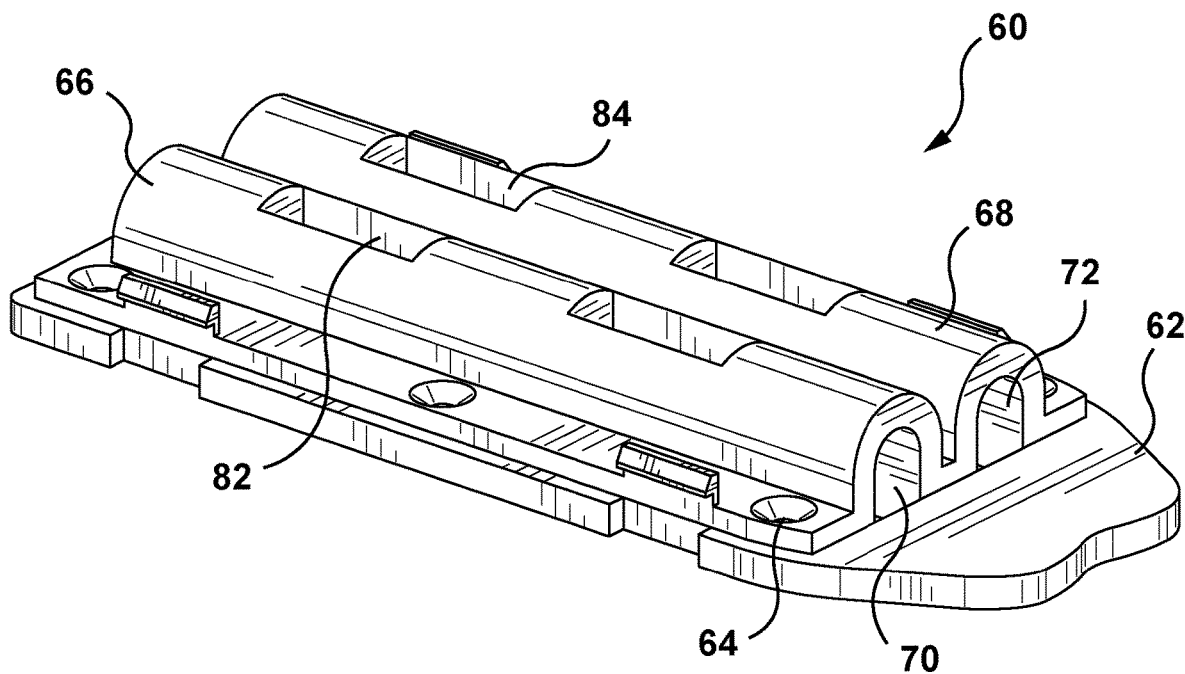
FIG. 13 is a perspective view of an exemplary hinge block.
Figure 14:
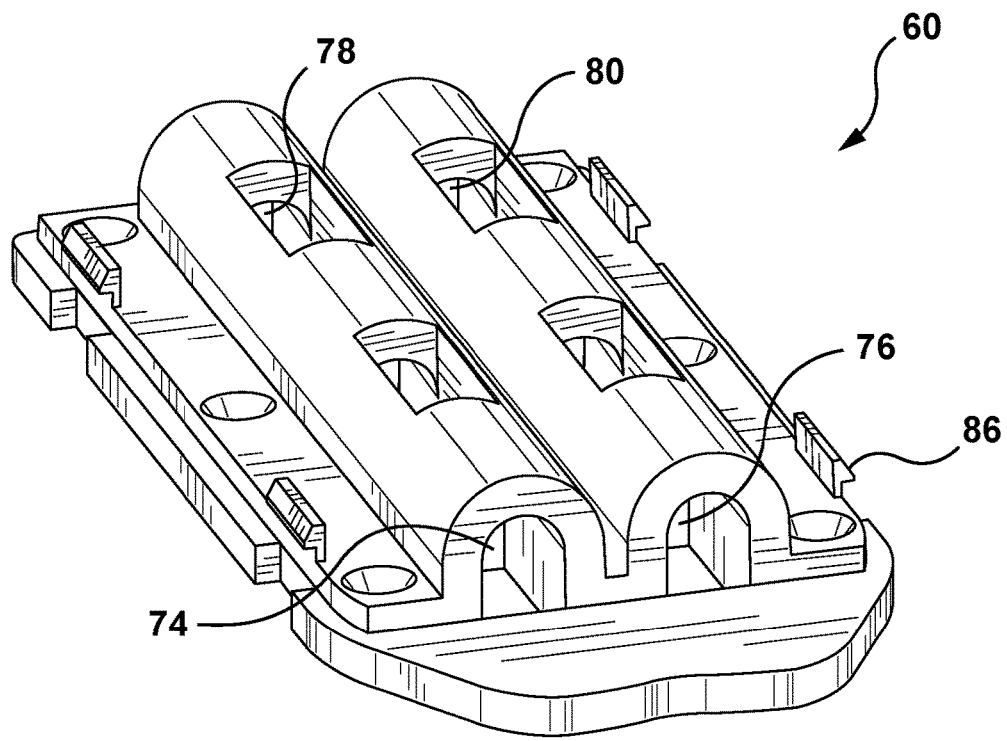
FIG. 14 is another perspective view of the hinge block.
Figure 15:
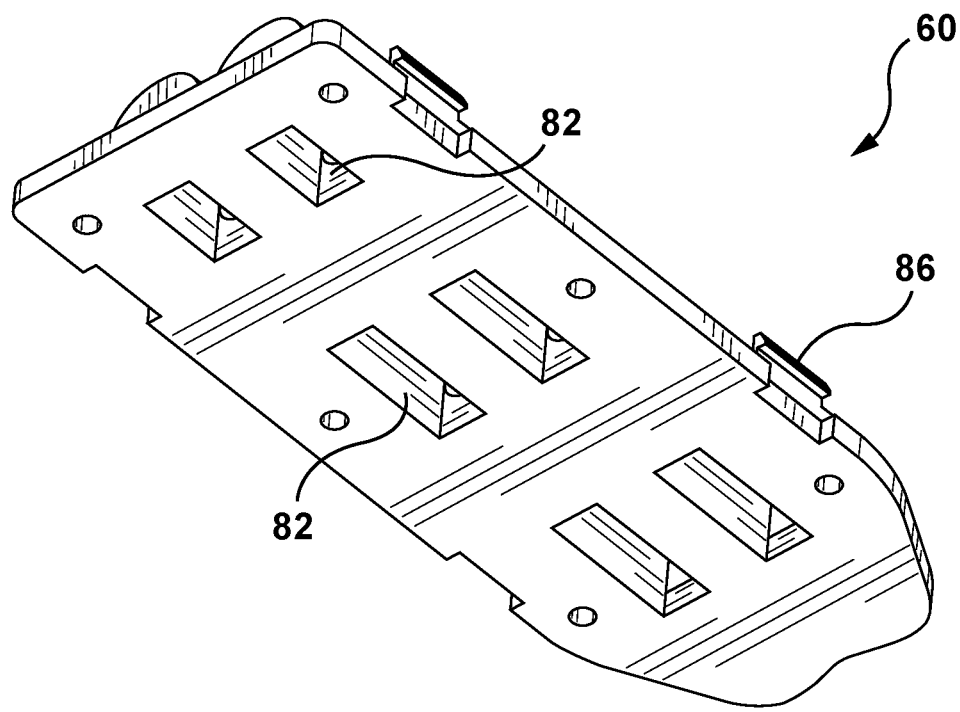
FIG. 15 is still another perspective view of the hinge block.
Figure 16:
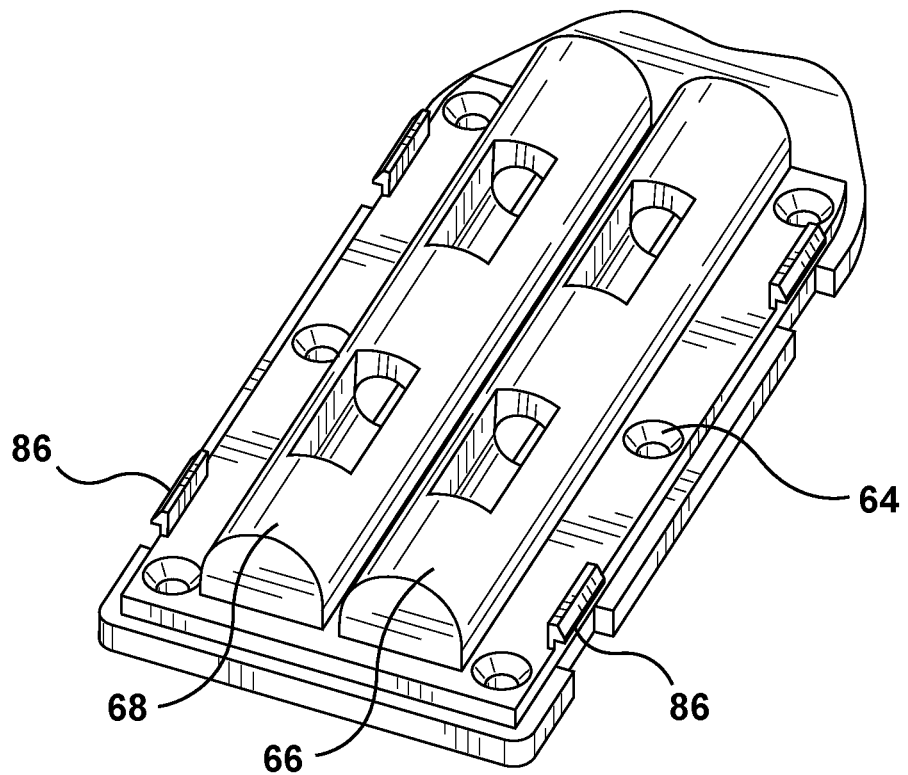
FIG. 16 is a further perspective view of the hinge block.

Spaced around the bottom surface 20, 22 of each board section 12, 14 are a plurality of respective recesses 40 and 42 recessed into the bottom surface that are located at a position corresponding to the location of the feet 24 and 26 on the other board section 12, 14 to provide areas for the feet 24 and 26 when in a folded position shown in FIGS. 9-12. The recesses 40 and 42 are shown having an oblong shape to provide an area for the feet 24 and 26 in both the first configuration and the second configuration. For example, when in the first configuration, the feet 24 and 26 will be received in a portion of the recesses 40 and 42 closer to the inner surfaces 32 and 34 and when in the second configuration the feet 24 and 26 will be received in a portion of the recesses 40 and 42 closer to the outer surfaces 36 and 38. When in the folded position, the cutting board 10 will be substantially rectangular in shape as shown in FIG. 11.

The first and second board sections 12 and 14 may be pivotally connected to one another by a hinge assembly 44 that allows the first and second board sections 12 and 14 to be used as a single board or separate but connected boards, and then folded for transpiration and storage. The hinge assembly 44 includes a first hinge element 50 attached to the first cutting board section 12, a second hinge element 52 attached to the second cutting board section 12, and a hinge rod 54 removably coupled to the first and second hinge elements 50 and 52. The first and second hinge elements 50 and 52 may be substantially the same as one another and thus the description of one is equally applicable to the other.

Turning additionally to FIGS. 13-16, each hinge element 50, 52 includes a hinge block 60 having a base 62 that abuts the respective bottom surface 20, 22 and that has a plurality of openings 64 extending therethrough, such as countersunk openings as shown, for receiving a suitable fastener to attach the hinge block 60 to the respective bottom surface 20, 22. Extending from the base 62 is a pair or rod receptacles 66 and 68 having a respective opening 70 and 72 for receiving an end of the rod 54 and a respective passage 74 and 76 in communication with the opening 70, 72 in which the rod is disposed. Each passage 74, 76 has a closed end 78, 80 that serves as a stop for the rod 54 when inserted into the passage 74, 76. Each rod receptacle 66, 68 can include one or more openings 82 and 84 respectively along its length at its top and/or bottom portions to allow for material savings and ease of manufacturing. The hinge block 60 can also include one or more tabs 86 extending upward from the base 62, and as shown a plurality of tabs in the form of fingers having a radially outwardly projecting catch. The tabs 86 are provided on the sides of the hinge block 60.

Figure 17:
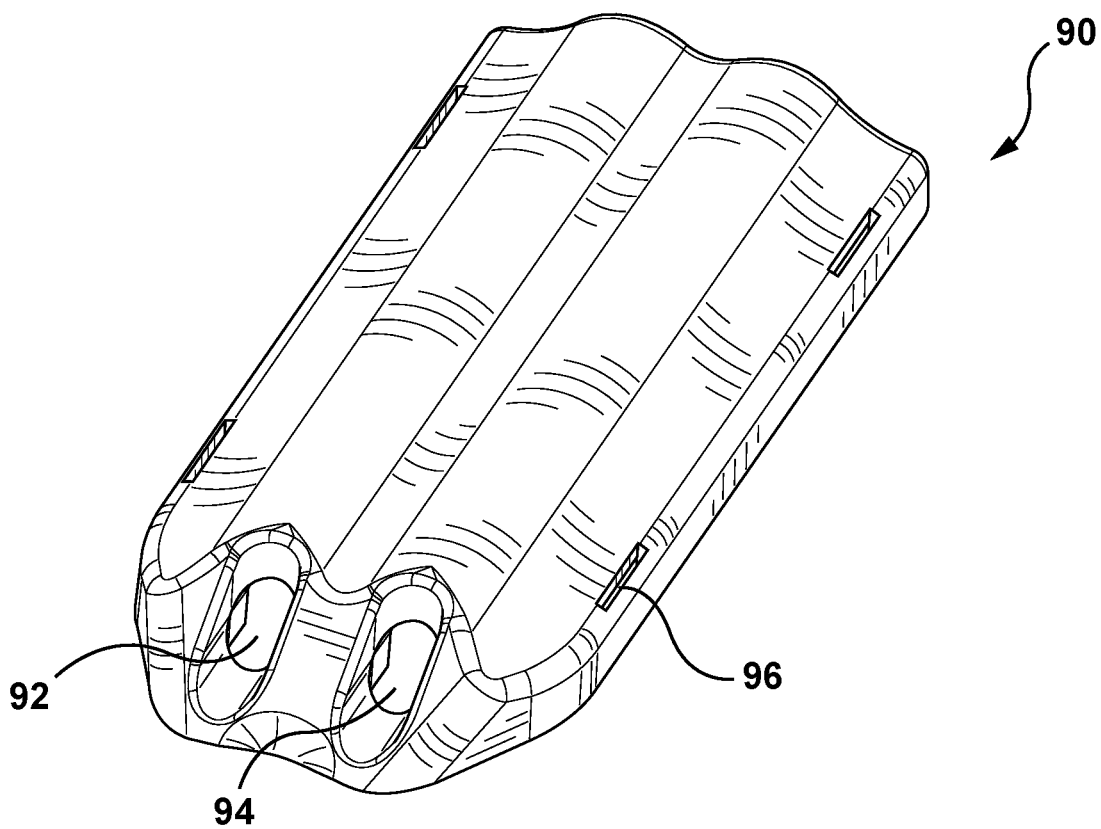
FIG. 17 is a perspective view of a hinge cover.
Figure 18:
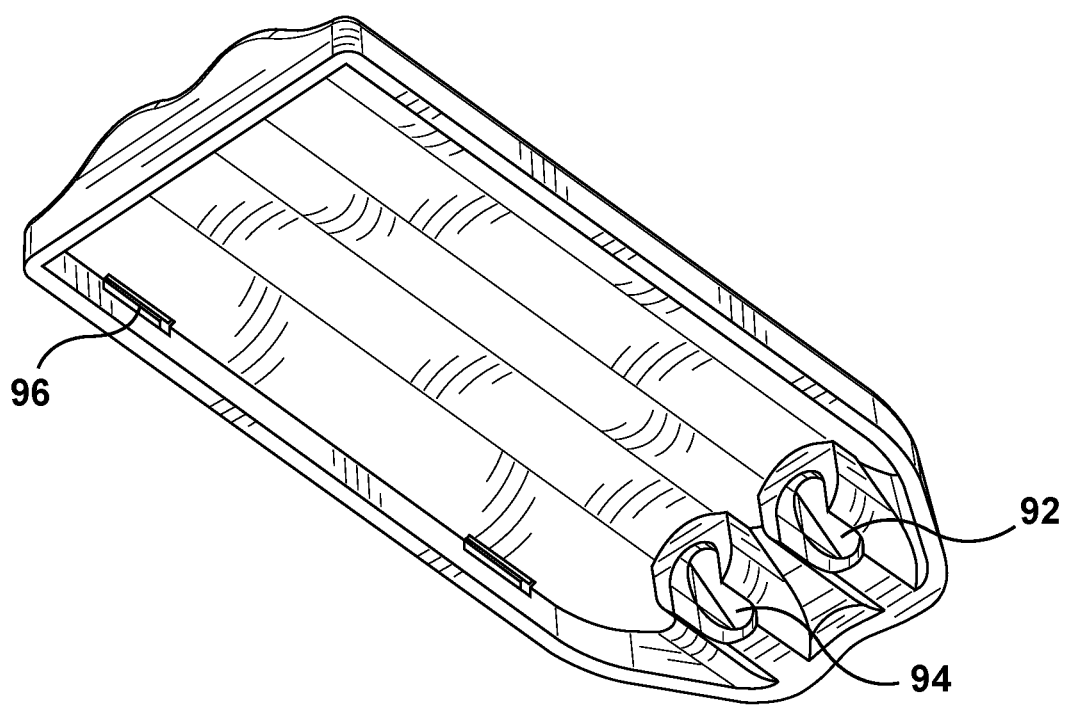
FIG. 18 is another perspective view of the hinge cover.

As shown in FIGS. 17 and 18, each hinge element 50, 52 also includes a hinge cover 90 configured to be removably connected to the hinge block 60. The hinge cover 90 includes a pair of openings 92 and 94 that align with the openings 70 and 72 respectively and that are angled relative to the front of the cover to guide the rod 54 into the openings 70 and 72. The hinge cover 90 also includes a slot 96 corresponding to each of the tabs 86. One of the tabs 86 snaps into each slot 96 to secure the hinge cover 90 to the hinge block 60 and to provide a weep hole for any liquid in the hinge element 50, 52, such as water from washing, to self-drain from the hinge element 50, 52. The hinge block 60 and the hinge cover 90 may be made of a suitable polymer, such as a self-lubricating polypropylene, a high-density polyethylene, a polyolefin, etc.

Figure 19:
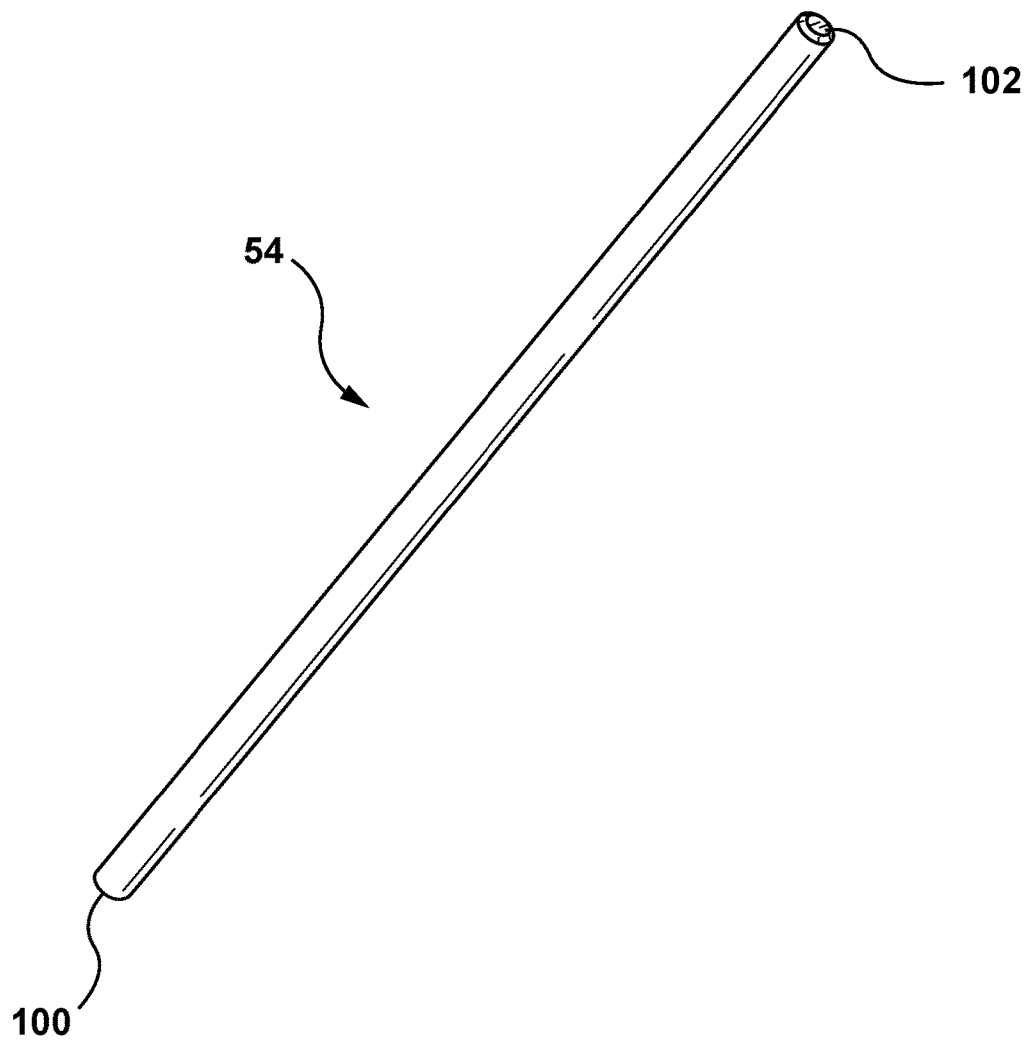
FIG. 19 is a perspective view of a hinge rod.
Figure 20:
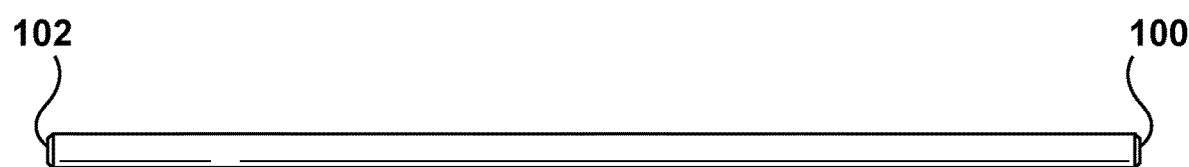
FIG. 20 is a front view of the hinge rod.
Figure 22:
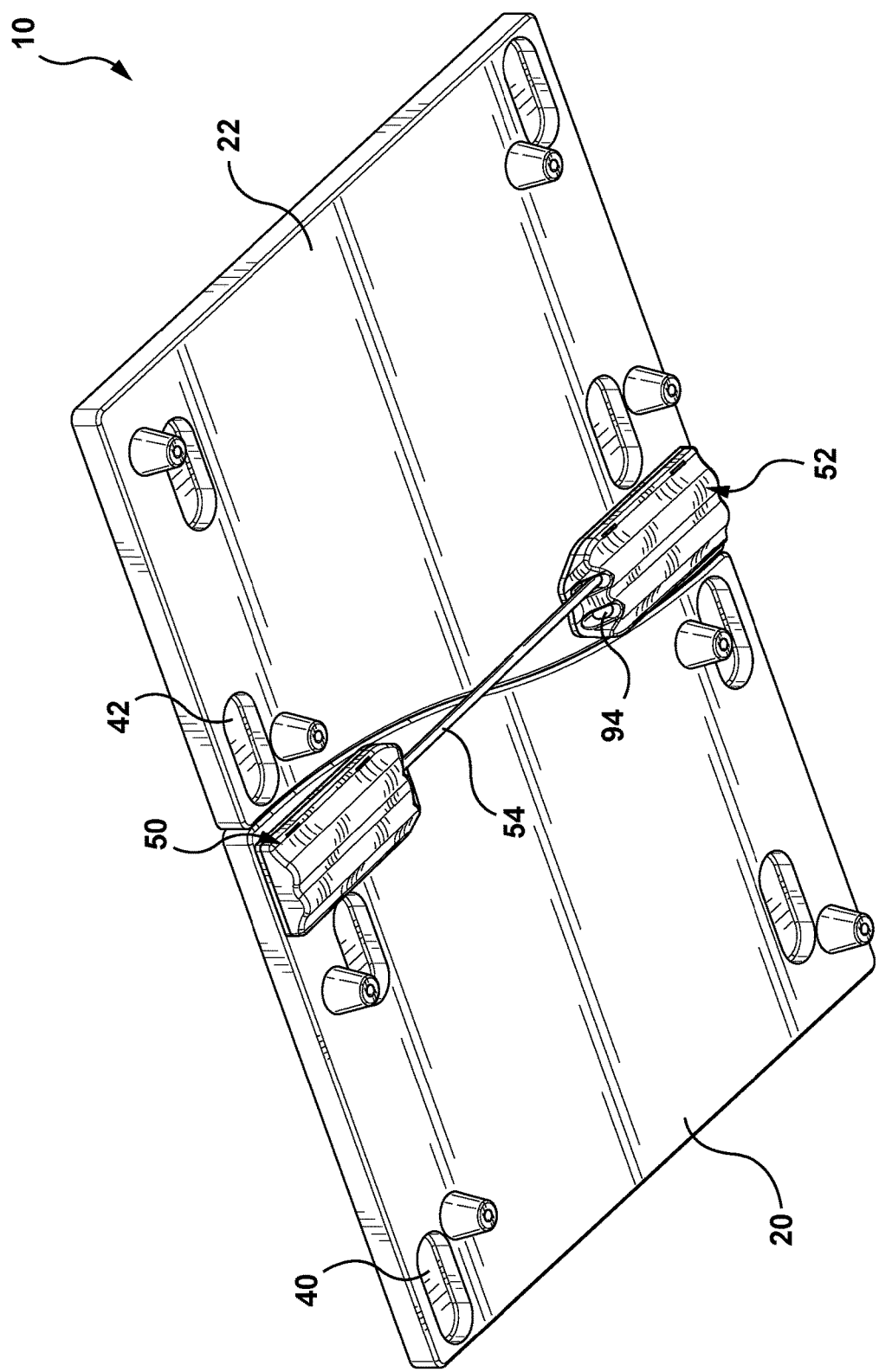
FIG. 22 is a bottom perspective view of the cutting board.

As shown in FIGS. 19 and 20, the hinge rod 54 has a first end 100 configured to be received in one of the openings 70 or 72 of the hinge block 60 of the first hinge element 50 and a second end 102 configured to be received in one of the openings 70 or 72 of the hinge block 60 of the second hinge element 52. The first and second ends 100 and 102 may each be beveled to assist in guiding the rod 54 into the openings 70 and 72. The hinge rod 54 and the passages 74 and 76 are sized such that the hinge rod 54 is held in the passages 74 and 76 by a pressure fit, and the hinge rod may be inserted and removed without the use of a tool. The hinge rod 54 is disposed in the passage 76 in the hinge block 60 of each hinge element 50 and 52 in the first configuration as shown in FIG. 2, and disposed in the passage 76 in the hinge block 60 of one of the elements 50 or 52 and in the passage 74 in the hinge block 60 of the other of the elements 50 or 52 in the second configuration as shown in FIG. 22. The hinge rod 54 may be made of a suitable material such as metal.

Figure 23:
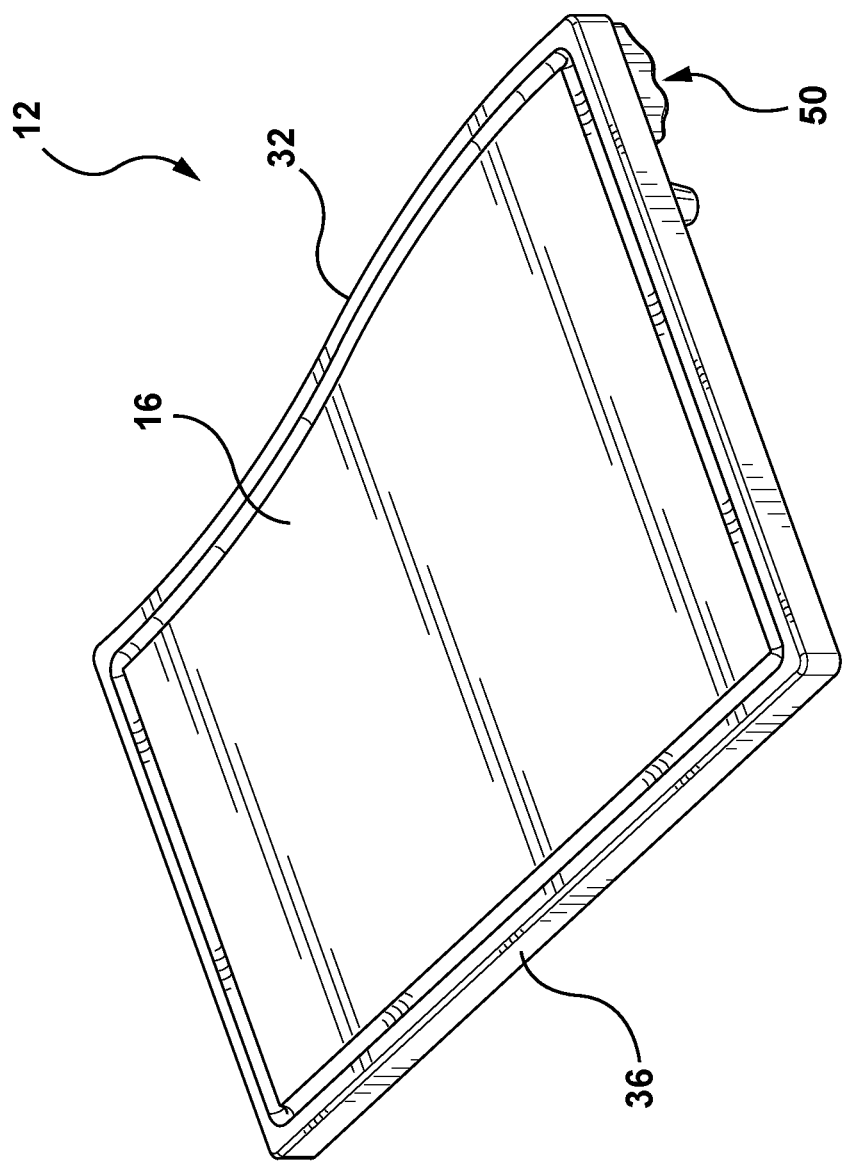
FIG. 23 is a perspective view of a first board section.
Figure 24:
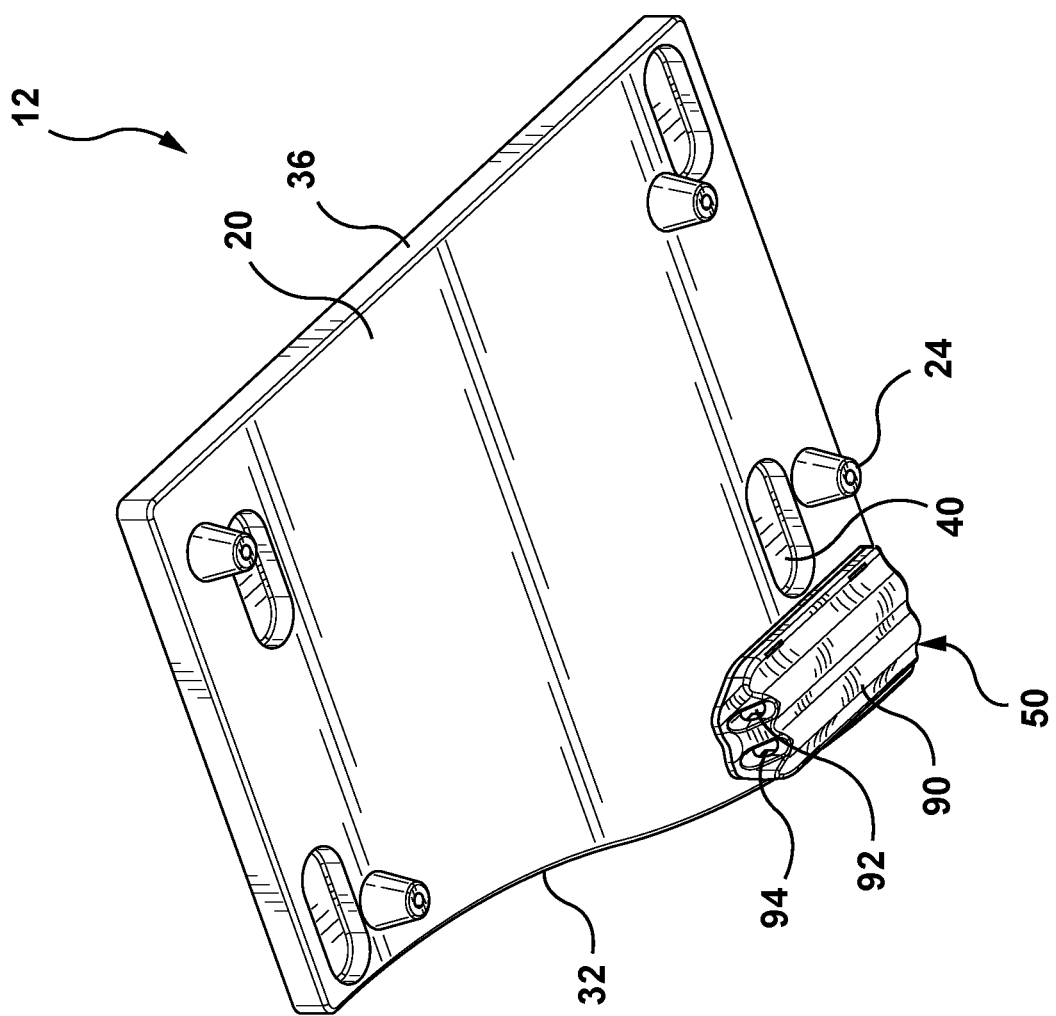
FIG. 24 is a bottom perspective view of the first board section.

Turning now to FIGS. 23 and 24, the first board section 12 is shown disconnected from the hinge rod 54 and the second board section 14. The first board section 12 can be disconnected from the second board section 14 to allow the board sections 12 and 14 to be used independently, for cleaning, for transport, storage, etc.

Figure 25:
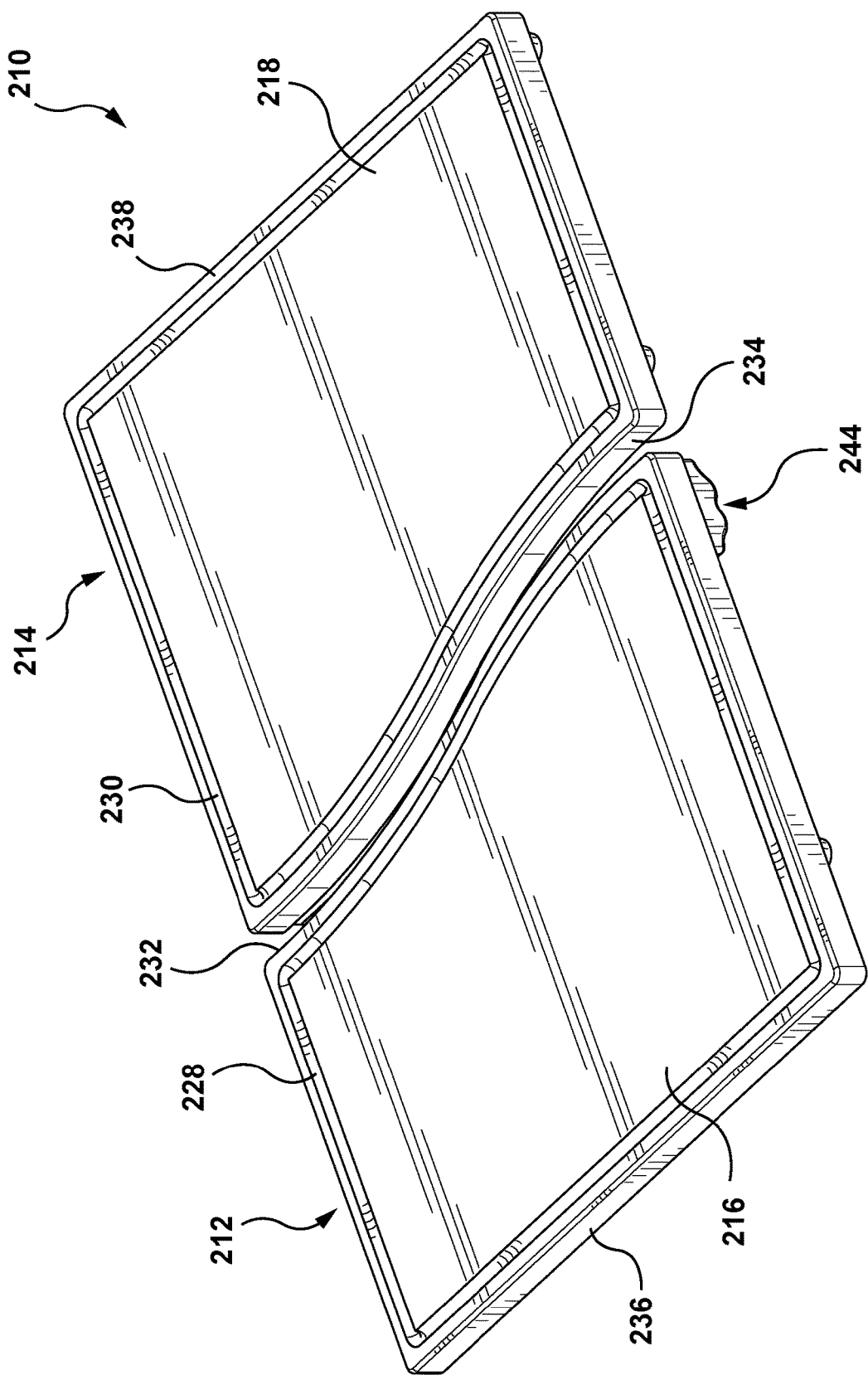
FIG. 25 is a top perspective view of another exemplary cutting board in an unfolded position.
Figure 26:
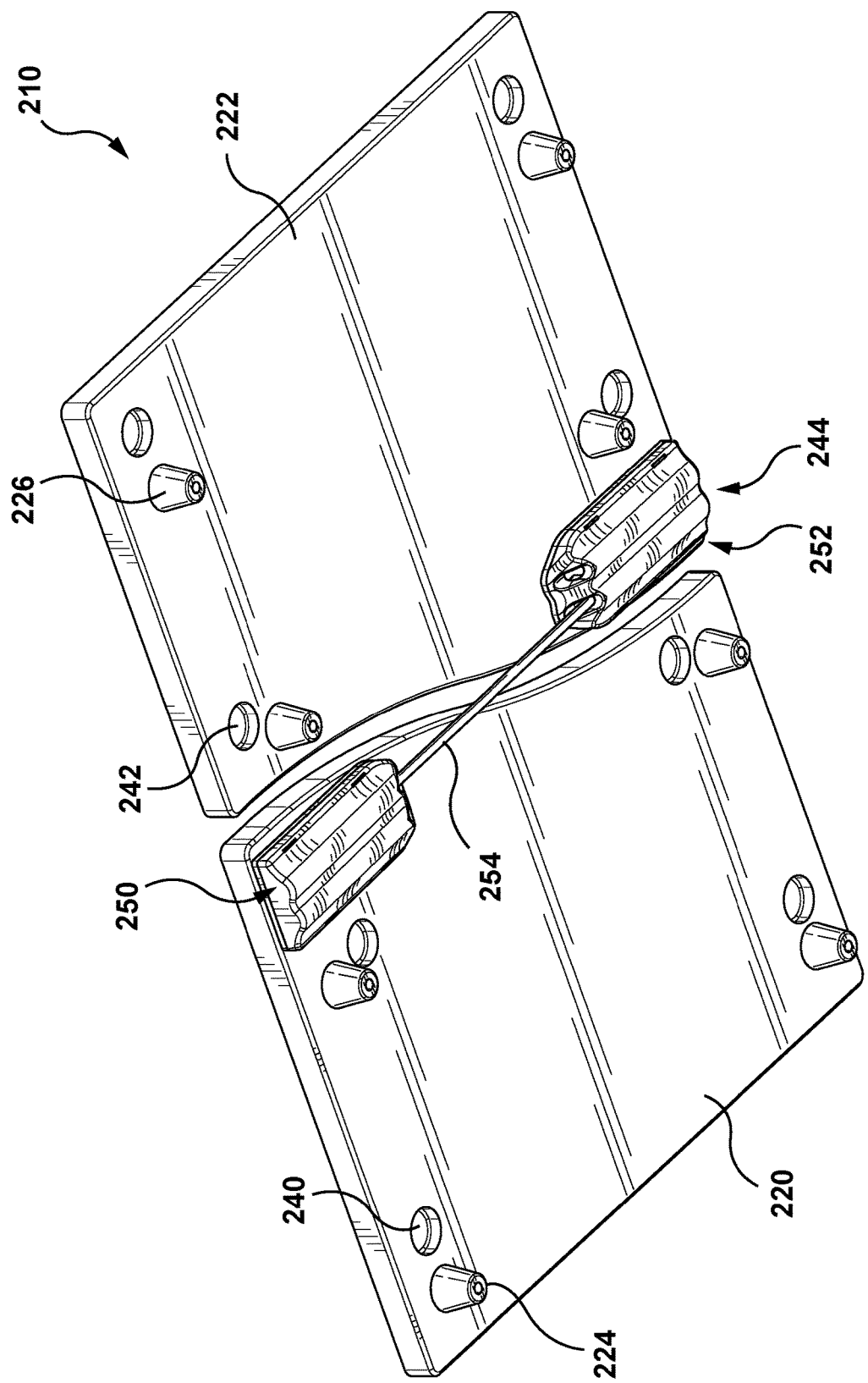
FIG. 26 is a bottom perspective view of the cutting board.

Turning now to FIGS. 25 and 26, an exemplary embodiment of the cutting board is shown at 210. The cutting board 210 is substantially the same as the above-referenced cutting board 10, and consequently the same reference numerals but indexed by 200 are used to denote structures corresponding to similar structures in the cutting boards. In addition, the foregoing description of the cutting board 10 is equally applicable to the cutting board 210 except as noted below.

The cutting board 210 includes a first board section 212 and a second board section 214 that may be made of any suitable material, such as wood, bamboo, etc. The first and second board sections 212 and 214 are spaced from one another to prevent bacteria migration between the two sections. Each of the board sections 212 and 214 includes a respective top surface 216, 218 serving as a cutting surface and a respective bottom surface 220, 222. The bottom surfaces 220 and 222 are configured to be spaced from a countertop surface by a plurality of feet 224, 226 respectively attached to the first and second board sections 212 and 214 in any suitable manner, such as by a fastener or adhesive, and the feet prevent the cutting board from sliding on the countertop surface, Extending along the perimeter of top surfaces 216 and 218 and radially inwardly spaced from a edge of each board section 212, 214 is a respective well 228, 230 for collection liquids, such as juice, blood, etc.

Each of the first and second cutting board sections 212 and 214 also include a respective inner surface 232, 234 that face one another when connected, and a respective outer surface 236, 238 opposite the respective inner surface 232, 234. The inner surfaces 232 and 234 are curved as discussed above. Spaced around the bottom surface 220, 222 of each board section 212, 214 are a plurality of respective recesses 240 and 242, for example circular recesses, that are located at a position corresponding to the location of the feet 224 and 226 on the other board section 212, 214 to provide areas for the feet 224 and 226 when in a folded position.

The first and second board sections 212 and 214 may be pivotally connected to one another by a hinge assembly 244 that allows the first and second board sections 212 and 214 to be used as a single board or separate but connected boards, and then folded for transpiration and storage. The hinge assembly 244 includes a first hinge element 250 attached to the first cutting board section 212, a second hinge element 252 attached to the second cutting board section 212, and a hinge rod 254 removably coupled to the first and second hinge elements 250 and 252 as discussed above regarding the cutting board 10.

Figure 21:
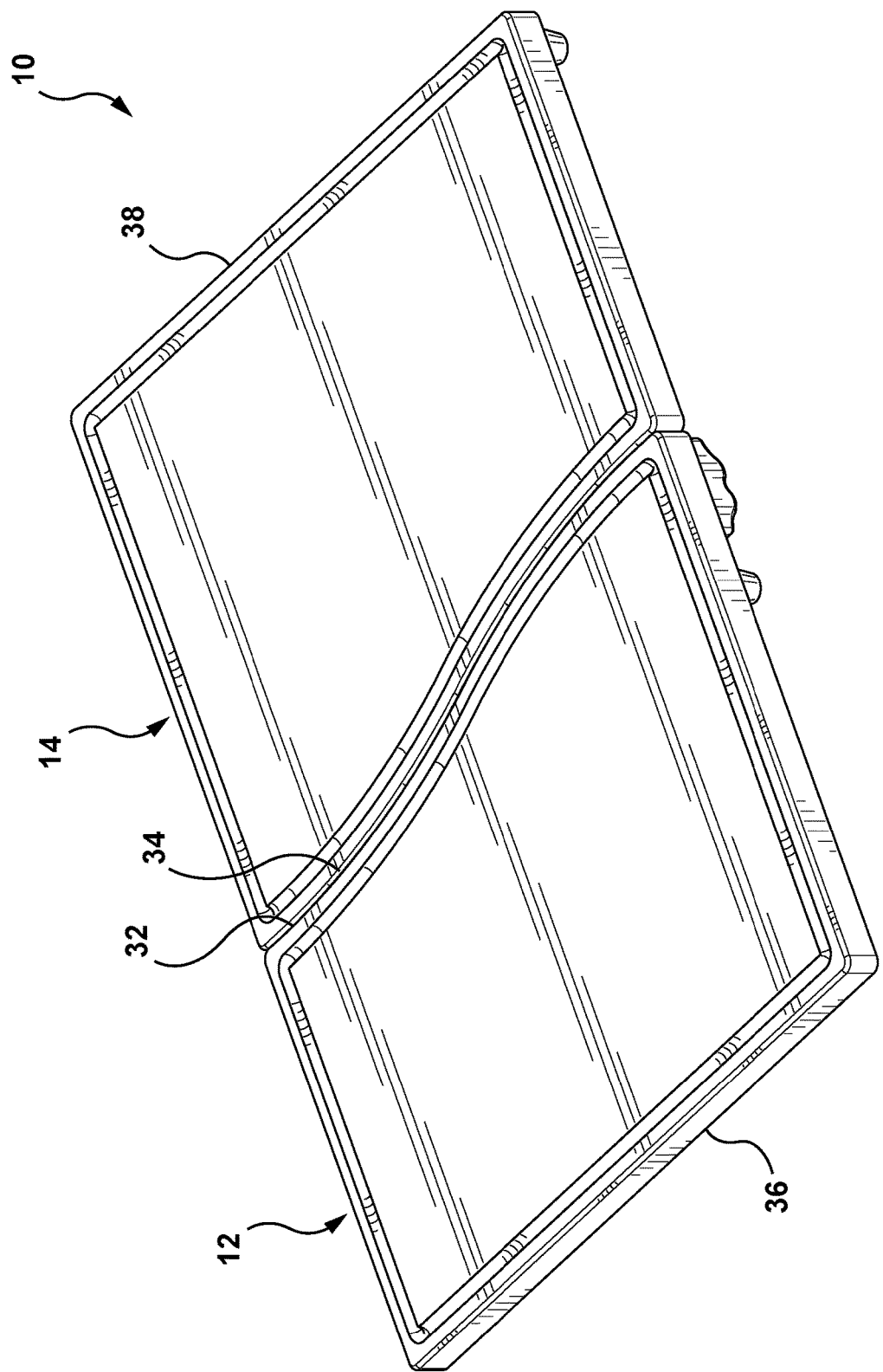
FIG. 21 is a top perspective view of an exemplary cutting board in an unfolded position and a second configuration.

The pivot rod 254 may be moved to different openings in the hinge elements 250 and/or 252 as discussed above to move the cutting board 210 from the first configuration shown in FIG. 25 to the second configuration where the inner surfaces 232 and 234 abut one another along their lengths to form a one-piece board without a space between the sections 212 and 214 similar to the configuration shown in FIG. 21.

Figure 27:
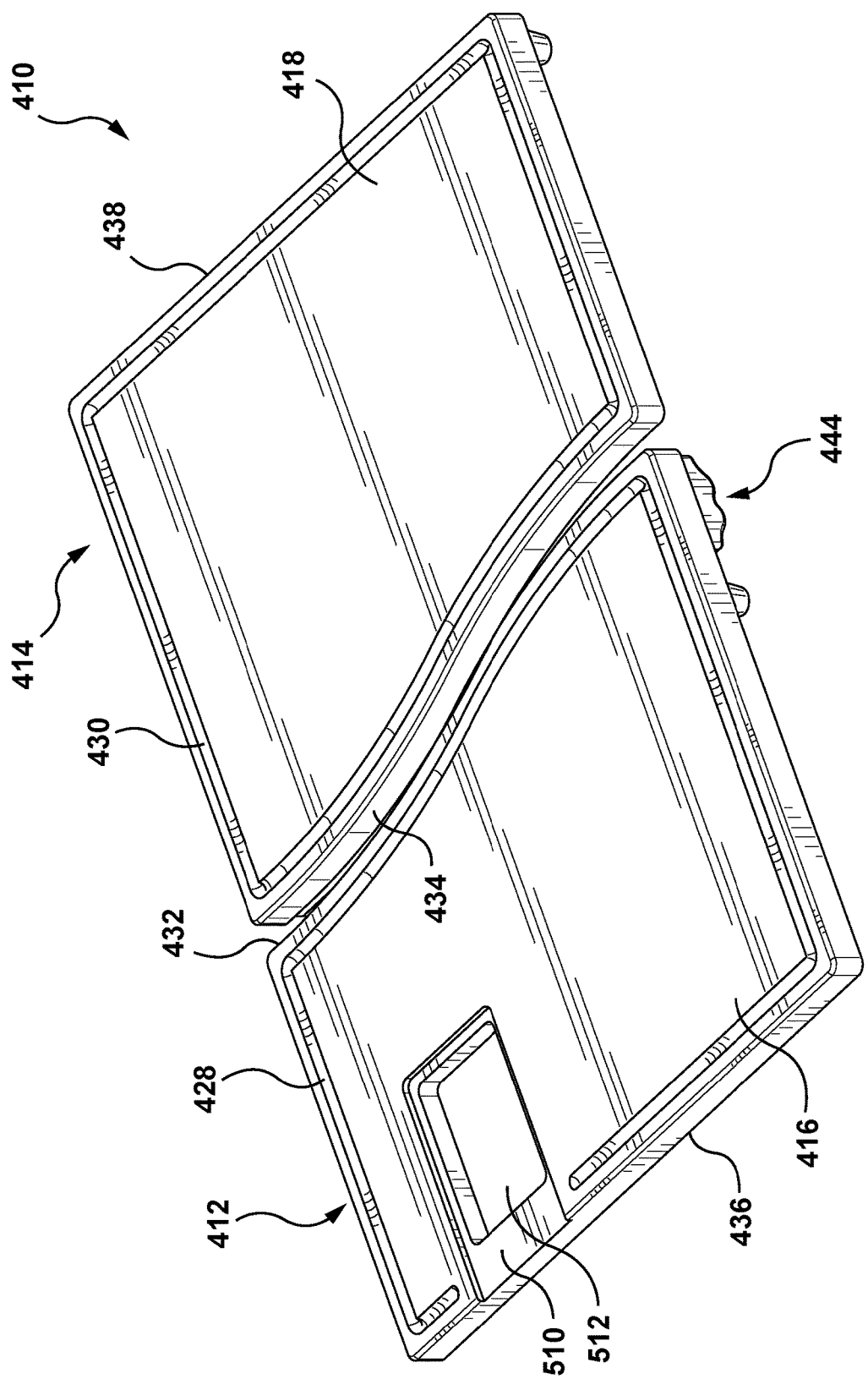
FIG. 27 is a top perspective view of still another exemplary cutting board in an unfolded position.
Figure 28:
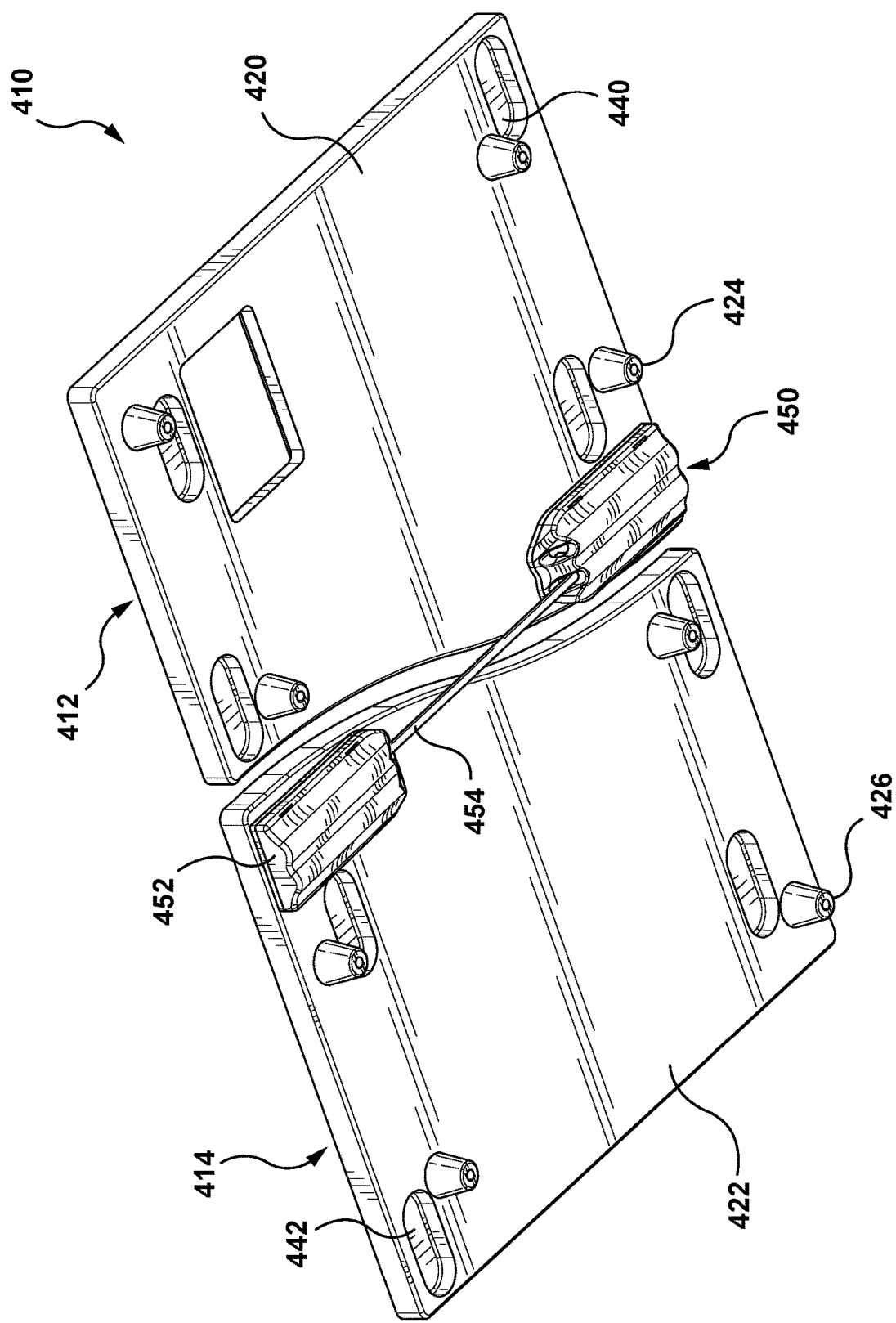
FIG. 28 is a bottom perspective view of the cutting board.

Turning now to FIGS. 27 and 28, an exemplary embodiment of the cutting board is shown at 410. The cutting board 410 is substantially the same as the above-referenced cutting board 10, and consequently the same reference numerals but indexed by 400 are used to denote structures corresponding to similar structures in the cutting boards. In addition, the foregoing description of the cutting board 10 is equally applicable to the cutting board 410 except as noted below.

The cutting board 410 includes a first board section 412 and a second board section 414 that may be made of any suitable material, such as wood, bamboo, etc. The first and second board sections 412 and 414 are spaced from one another to prevent bacteria migration between the two sections. Each of the board sections 412 and 414 includes a respective top surface 416, 418 serving as a cutting surface and a respective bottom surface 420, 422. The bottom surfaces 420 and 422 are configured to be spaced from a countertop surface by a plurality of feet 424, 426 respectively attached to the first and second board sections 412 and 414 in any suitable manner, such as by a fastener or adhesive, and the feet prevent the cutting board from sliding on the countertop surface, Extending along the perimeter of top surfaces 416 and 418 and radially inwardly spaced from a edge of each board section 412, 414 is a respective well 428, 430 for collection liquids, such as juice, blood, etc.

Each of the first and second cutting board sections 412 and 414 also include a respective inner surface 432, 434 that face one another when connected, and a respective outer surface 436, 438 opposite the respective inner surface 432, 434. The inner surfaces 432 and 434 are curved as discussed above. Spaced around the bottom surface 420, 422 of each board section 412, 414 are a plurality of respective recesses 440 and 442 that are located at a position corresponding to the location of the feet 424 and 426 on the other board section 412, 414 to provide areas for the feet 424 and 426 when in a folded position. The recesses 440 and 442 are shown having an oblong shape to provide an area for the feet 424 and 426 in both the first configuration and the second configuration as discussed above.

The first and second board sections 412 and 414 may be pivotally connected to one another by a hinge assembly 444 that allows the first and second board sections 412 and 414 to be used as a single board or separate but connected boards, and then folded for transpiration and storage. The hinge assembly 444 includes a first hinge element 450 attached to the first cutting board section 412, a second hinge element 452 attached to the second cutting board section 412, and a hinge rod 454 removably coupled to the first and second hinge elements 450 and 452 as discussed above regarding the cutting board 10.

The pivot rod 454 may be moved to different openings in the hinge elements 450 and/or 452 as discussed above to move the cutting board 410 from the first configuration shown in FIG. 27 to the second configuration where the inner surfaces 432 and 434 abut one another along their lengths to form a one-piece board without a space between the sections 412 and 414 similar to the configuration shown in FIG. 21.

Figure 29:
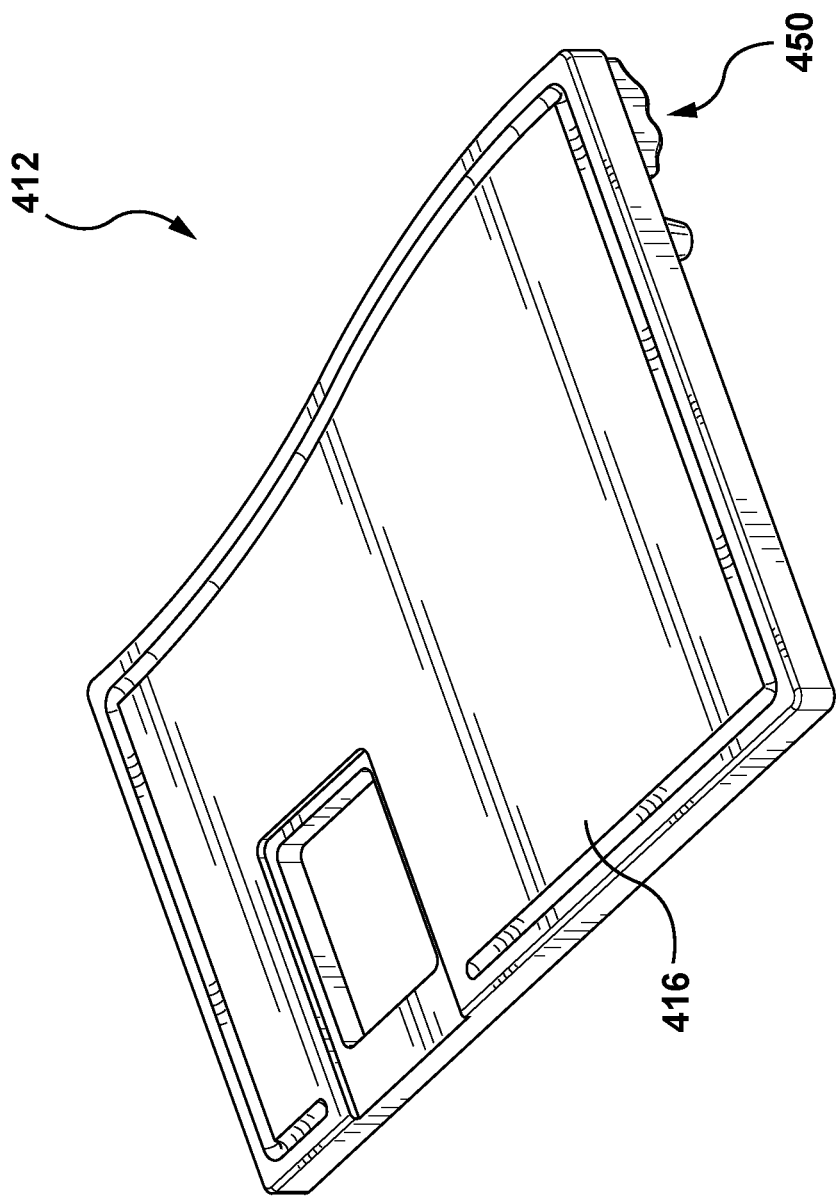
FIG. 29 is a perspective view of a first board section.
Figure 30:
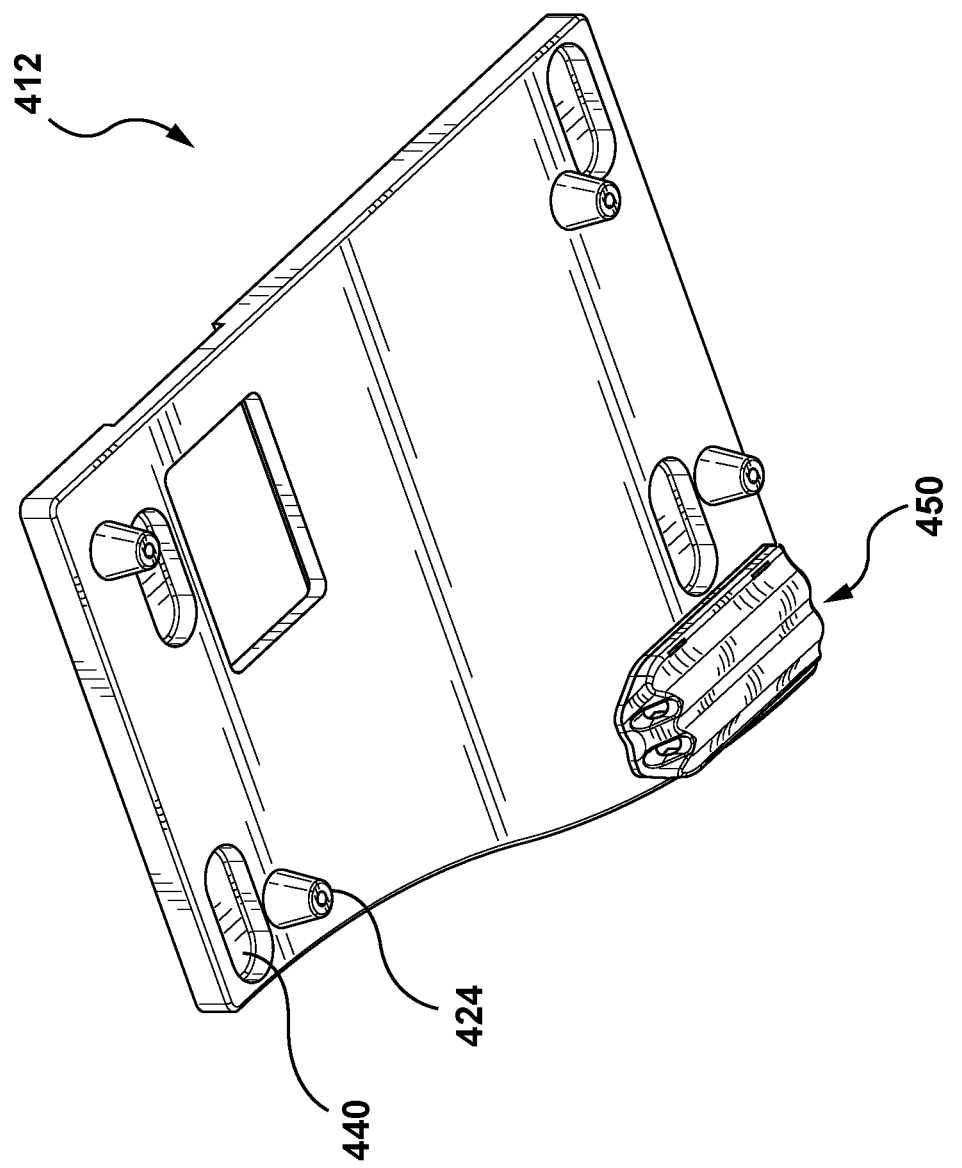
FIG. 30 is a bottom perspective view of the first board section.

Turning now to FIGS. 29 and 30, the first board section 412 is shown disconnected from the hinge rod 454 and the second board section 414. The first board section 412 can be disconnected from the second board section 414 to allow the board sections 412 and 414 to be used independently, with different board sections, for cleaning, for transport, storage, etc.

The first board section 412 also includes a recessed area 510 surrounding an accessory opening 512. The recessed area 510 opens to the outer surface 436 and extends downward into the board section 412 from the top surface 416 to define a stepped wall for holding an accessory in position. It will be appreciated that in an embodiment the second board section 414 may also include a recessed area and accessory opening.

Figure 31:
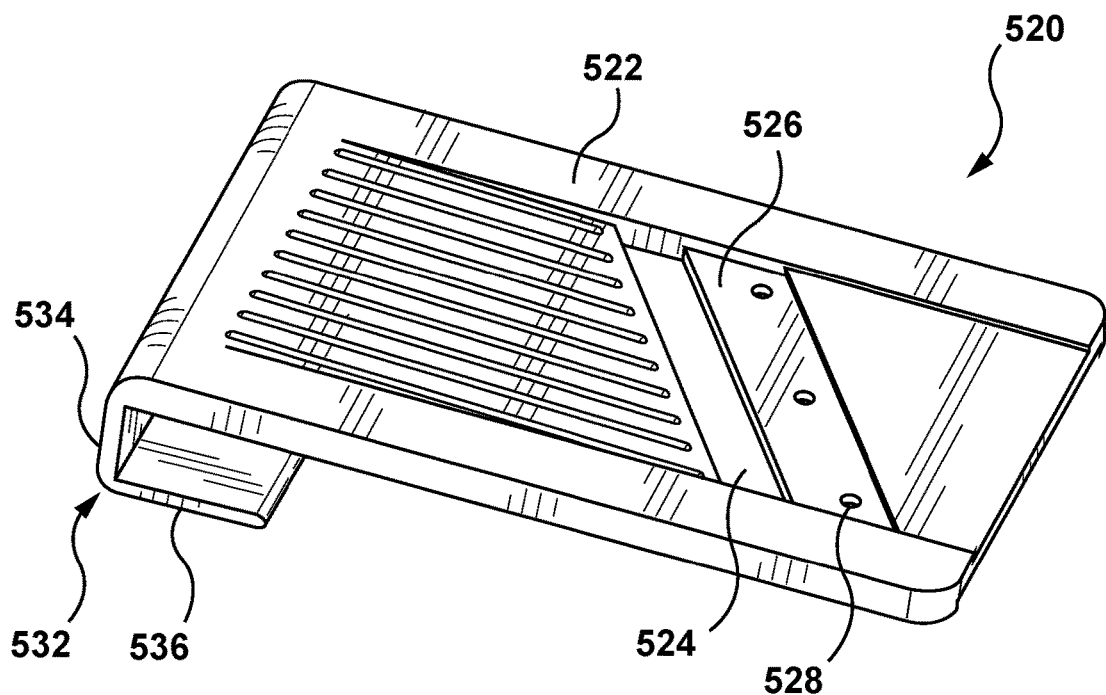
FIG. 31 is a top perspective view of a mandoline.
Figure 32:
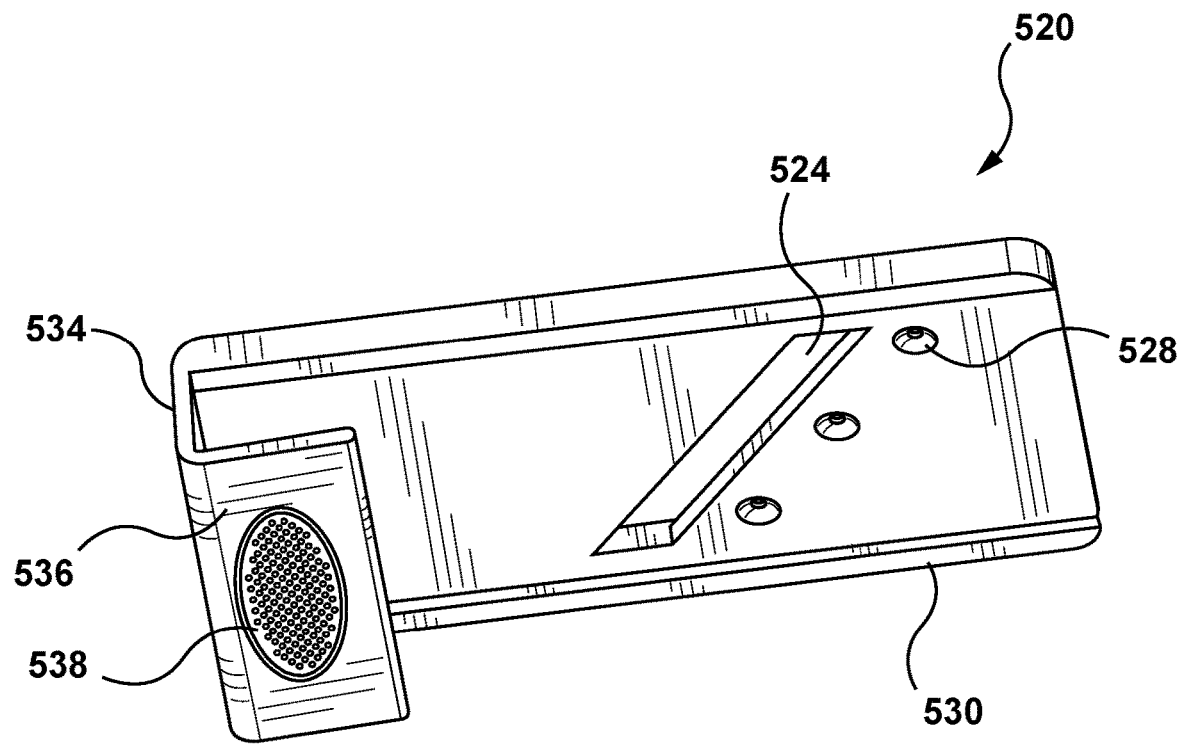
FIG. 32 is a bottom perspective view of the mandoline.

Referring additionally to FIGS. 31 and 32, a mandoline 520 is shown that may be attached to and removed from the first board section 412 at the recessed area 510. The mandoline 520 includes a body 522 having an opening 524 extending therethrough, for example a diagonally extending opening, and a blade receiving area 526 defining an edge of the opening 524 for cutting food. The blade receiving area 526 includes one or more openings 528 to which the blade can be attached. Alternatively, the blade may be integrally formed with the mandoline. A bottom of the body 522, for example downwardly extending sides 530 are configured to abut sides of the recessed area 510 on sides of the opening 512.

The mandoline 520 also includes a hook portion 532 having a leg 534 that abuts the outer surface 436 of the board section 412 and a leg 536 that abuts the bottom surface 420 of the board section 412 to hold the mandoline 520 in position. The hook portion 532 may be flexible to hold the mandoline 520 in position. A grip area 538 may be provided on the leg 536 for a user to grip to install and remove the mandoline 520. The interaction between the mandoline 520 and the recessed area 510 allows for one hand operation of the mandoline 520 by pressing food against the blade, without a fastener or other mechanical attachment to hold the mandoline 520 in position.

Figure 33:
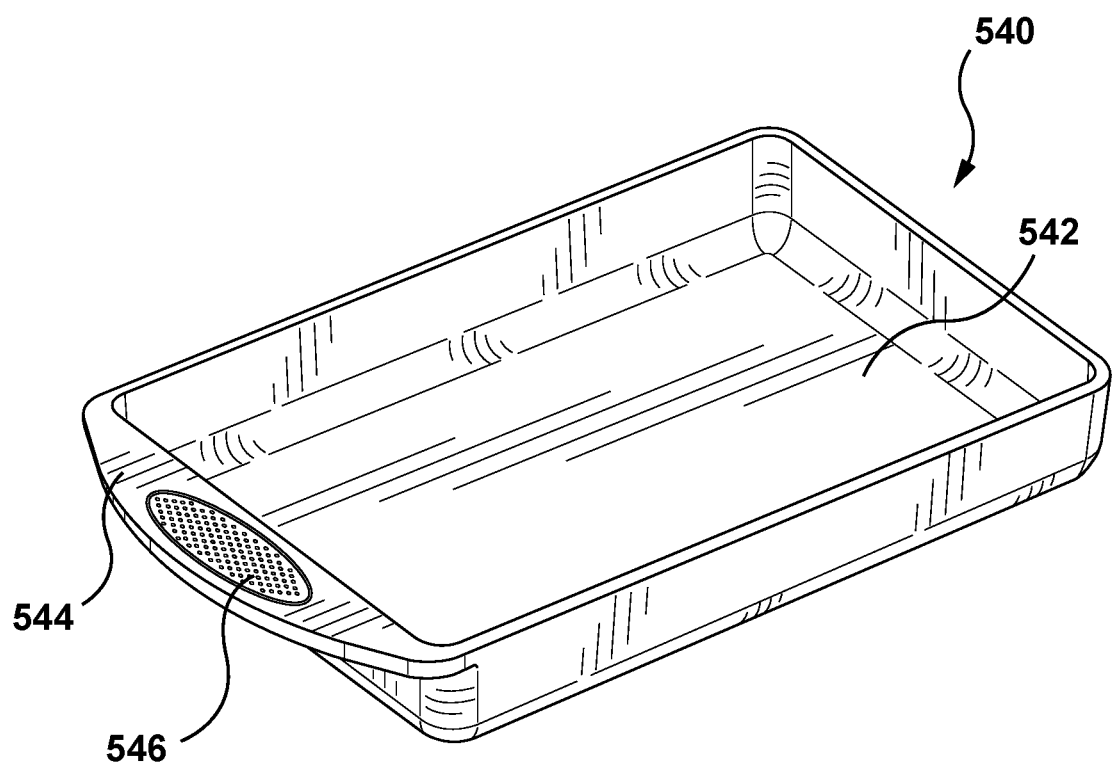
FIG. 33 is a perspective view of a tray.

FIG. 33 shows a tray 540 that may be positioned below the accessory opening 512 between the bottom surface 420 and the countertop surface to collect food and/or liquid that drops through the loaning 524 after being cut by the blade. The tray 540 includes a collection area 542 for collecting food and/or liquid and an arm 544 having a grip area 546 for a user to grip the tray 540.

Figure 34:
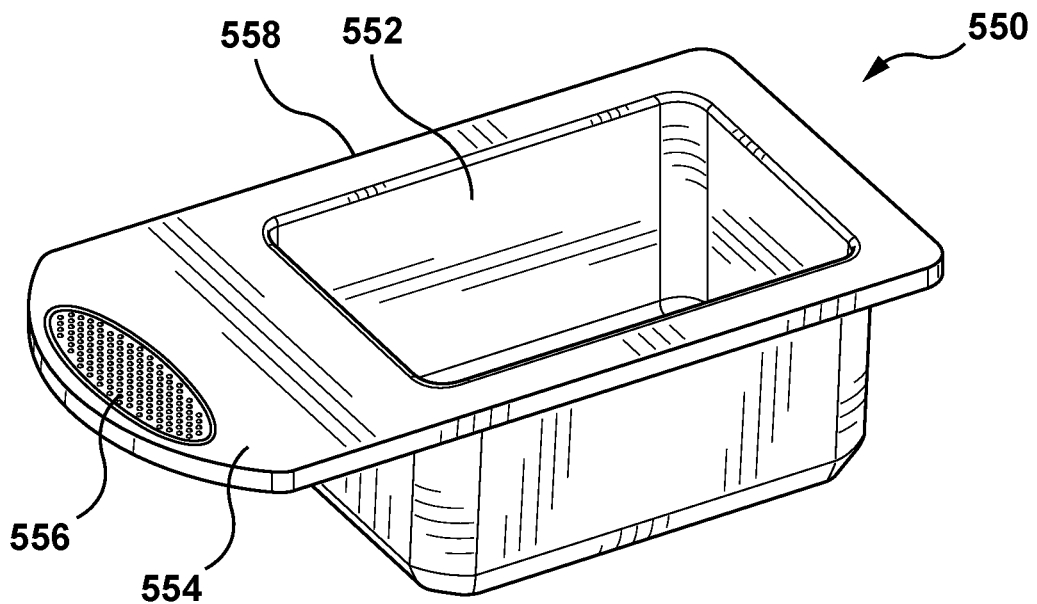
FIG. 34 is a top perspective view of a collection cup.
Figure 35:
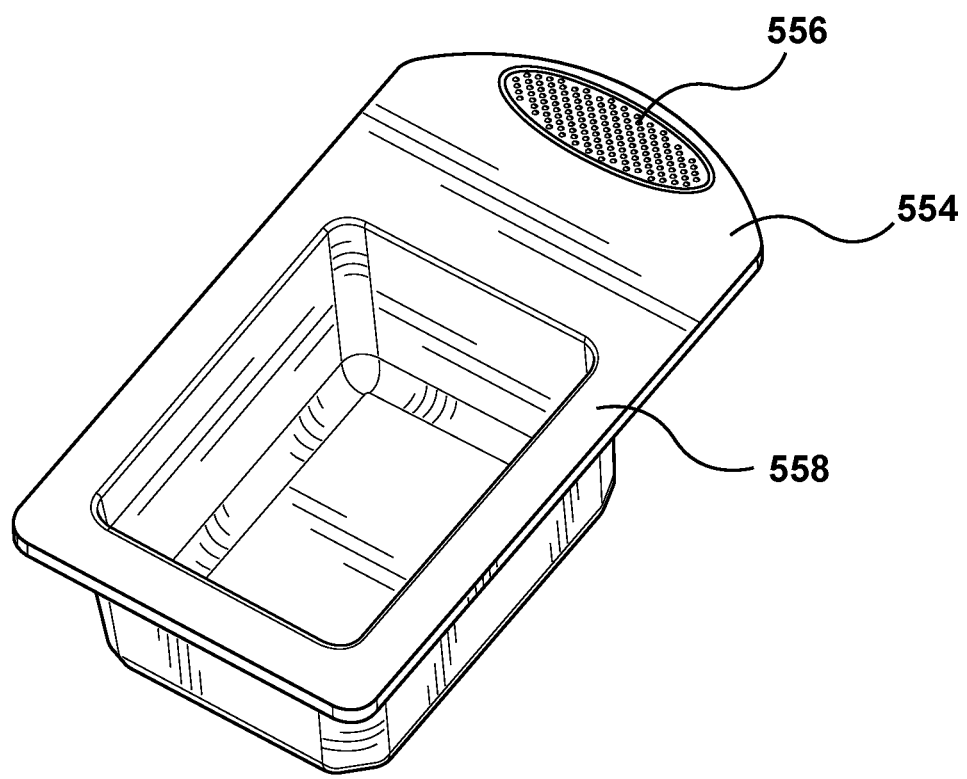
FIG. 35 is another top perspective view of the collection cup.

FIGS. 34 and 35 show a collection cup 550 that may be positioned in the recessed area 510 and accessory opening 512. The collection cup 550 includes a collection area 552 that extends through the accessory opening 512 and that may be suitably sized, for example having a volume of a one-cup measuring cup. The collection cup 550 also includes an arm 554 having a grip area 556 for a user to grip the collection cup 550, and a ledge 558 extending around the collection area 552 for abutting the recessed area 510 to hold the collection cup 550 flush or substantially flush with the top surface 416.

The aforementioned systems, components, (e.g., board sections, hinge elements, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A cutting board comprising:
    a first board section having a first top surface, a first bottom surface, a first inner surface, a first outer surface, a first front surface, and a first rear surface;
    a second board section having a second top surface, a second bottom surface, a second inner surface, a second outer surface, a second front surface, and a second rear surface, wherein at least one of the first and second board sections includes a recessed area opening to a respective outer surface and extending downward into a respective board section from a respective top surface, an accessory opening extending through the recessed area; and
    a hinge assembly configured to pivotally and removably couple the first and second board sections together such that the first and second inner surfaces face one another in an unfolded position and the first and second bottom surfaces face one another in a folded position.

2. The cutting board according to claim 1, wherein the hinge assembly has a first configuration where the first and second inner surfaces are spaced from one another and a second configuration where the first and inner surfaces abut one another.

3. The cutting board according to claim 2, wherein the first and second inner surfaces are correspondingly curved.

4. The cutting board according to claim 1, wherein the hinge assembly includes a first hinge element attached to the first bottom surface, a second hinge element attached to the second bottom surface, and a hinge rod removably coupled to the first and second hinge elements to removably couple the first and second board sections.

5. The cutting board according to claim 4, wherein the first and second hinge elements each include first and second rod receptacles adjacent one another for receiving an end of the hinge rod.

6. The cutting board according to claim 1, wherein the first and second board sections each include a well in the first and second top surfaces respectively that is radially inwardly spaced from an edge of the respective board section.

7. The cutting board according to claim 1, further including a plurality of feet attached to each of the first and second bottom surfaces to elevate the first and second cutting board sections above a counter.

8. The cutting board according to claim 7, further comprising a plurality of recesses in each of the first and second bottom surface, wherein each of the recesses in the first bottom surface corresponds to a location of one of the feet attached to the second bottom surface to receive a respective one of the feet in the folded position and each of the recesses in the second bottom surface corresponds to a location of one of the feet attached to the first bottom surface to receive a respective one of the feet in the folded position.

9. A cutting board comprising:
    a first board section having a top surface, a bottom surface, a curved inner surface, an outer surface, a front surface, and a rear surface, the first board section including a well in the top surface that is radially inwardly spaced from the inner surface, the front surface, and the rear surface of the board section; and
    a second board section having a having a top surface, a bottom surface, a curved inner surface, an outer surface, a front surface, and a rear surface, wherein the curved inner surface of the first board section and the curved inner surface of the second board section are inverted one hundred eighty degrees from one another;
    a recessed area extending downward into the first board section from the top surface of the first board section toward the bottom surface of the first board section to define a stepped wall for holding an accessory; and
    an accessory opening extending through the recessed area of the first board section that receives the accessory.

10. The cutting board according to claim 9, further comprising the accessory, wherein the accessory is removably placed on the recessed area for receiving food.

11. The cutting board according to claim 10, wherein the accessory holds a volume and has an outer ledge that abuts the recessed area to hold the accessory substantially flush with the top surface of the first board section.

12. The cutting board according to claim 10, wherein the accessory has an arm having a ridged area for gripping.

13. The cutting board according to claim 10, further including a plurality of feet attached to the bottom surface of each of the first and the second board sections to elevate the cutting board above a counter.

14. The cutting board according to claim 13, further comprising a plurality of recesses on the bottom surface of each of the first and the second board sections, wherein each of the recesses on each of the bottom surfaces corresponds to a location of one of the feet attached to each of the bottom surfaces.

15. A cutting board assembly comprising:
    a first board section having a first top surface, a first bottom surface, a first inner surface, a first outer surface, a first front surface, and a first rear surface;
    a second board having a second top surface, a second bottom surface, a second inner surface, a second outer surface, a second front surface, and a second rear surface, wherein the first and second inner surfaces are curved and inverted one hundred eighty degrees from one another;

a recessed area extending downward into the first board section from the first top surface toward the first bottom surface to define a stepped wall; and at least one attachment configured to be positioned in the recessed area.

16. The cutting board assembly according to claim 15, further including a mandolin attachment configured to be removably attached to the first board section at the recessed area, wherein the mandolin attachment includes a hook portion having a leg that abuts the outer surface of the first board section and a leg that abuts the bottom surface of the first board section to hold the mandolin attachment in position.

17. The cutting board assembly according to claim 15, further including a cup attachment configured to be positioned in the recessed area, wherein the cup attachment latches onto an outer rim of the recessed area flush with the first top surface.

* * * * *